United States Patent
Koushik et al.

(10) Patent No.: US 9,262,731 B1
(45) Date of Patent: Feb. 16, 2016

(54) SERVICE TICKET ANALYSIS USING AN ANALYTICS DEVICE

(71) Applicant: Accenture Global Services Limited, Dublin (IE)

(72) Inventors: Vijayaraghavan Koushik, Chennai (IN); Rajendra T. Prasad, Bangalore (IN); Chetan Belgur, Tumkur (IN); Koustuv Jana, Bangalore (IN); Priya Athreyee, Chennai (IN); Bhaskar Ghosh, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 14/657,161

(22) Filed: Mar. 13, 2015

(30) Foreign Application Priority Data

Nov. 13, 2014 (IN) ............................ 5713/CHE/2014

(51) Int. Cl.
  *G06F 17/00* (2006.01)
  *G06Q 10/06* (2012.01)

(52) U.S. Cl.
  CPC ...................................... *G06Q 10/06* (2013.01)

(58) Field of Classification Search
  CPC ................... H01L 2924/0002; H01L 2924/00; H01L 21/32136; H01L 21/76838; H01L 27/12; H01L 27/124; G06Q 10/06
  USPC ............................. 235/375; 709/223; 714/25
  See application file for complete search history.

(56) References Cited

U.S. PATENT DOCUMENTS

| | | | | |
|---|---|---|---|---|
| 6,957,257 B1* | 10/2005 | Buffalo | ............... | G06F 11/0748 709/200 |
| 8,794,513 B2* | 8/2014 | Wayne | ................... | G06Q 10/06 235/379 |
| 2004/0039726 A1* | 2/2004 | Shimizu | ............ | G06F 17/30876 |
| 2007/0299953 A1* | 12/2007 | Walker | ................... | G06Q 10/06 709/223 |
| 2010/0161539 A1* | 6/2010 | Kandanala | .......... | H04L 41/5074 706/47 |
| 2013/0246125 A1* | 9/2013 | DiGioacchino | .... | G06Q 30/0201 705/7.33 |

* cited by examiner

*Primary Examiner* — Seung Lee
(74) *Attorney, Agent, or Firm* — Harrity & Harrity, LLP

(57) ABSTRACT

A device may receive ticket information associated with one or more service tickets. The ticket information may include a ticket category and ticket data associated with the one or more service tickets. The ticket data may be associated with the ticket category. The ticket data may describe information related to resolving the one or more service tickets. The device may identify, based on the ticket category or the ticket data, an association between the ticket category and an analysis category. The analysis category may be used to analyze the ticket information. The device may generate categorized ticket information based on the analysis category and the ticket information. The categorized ticket information may include the ticket data, and the ticket data may be associated with the analysis category. The device may provide the categorized ticket information.

20 Claims, 18 Drawing Sheets

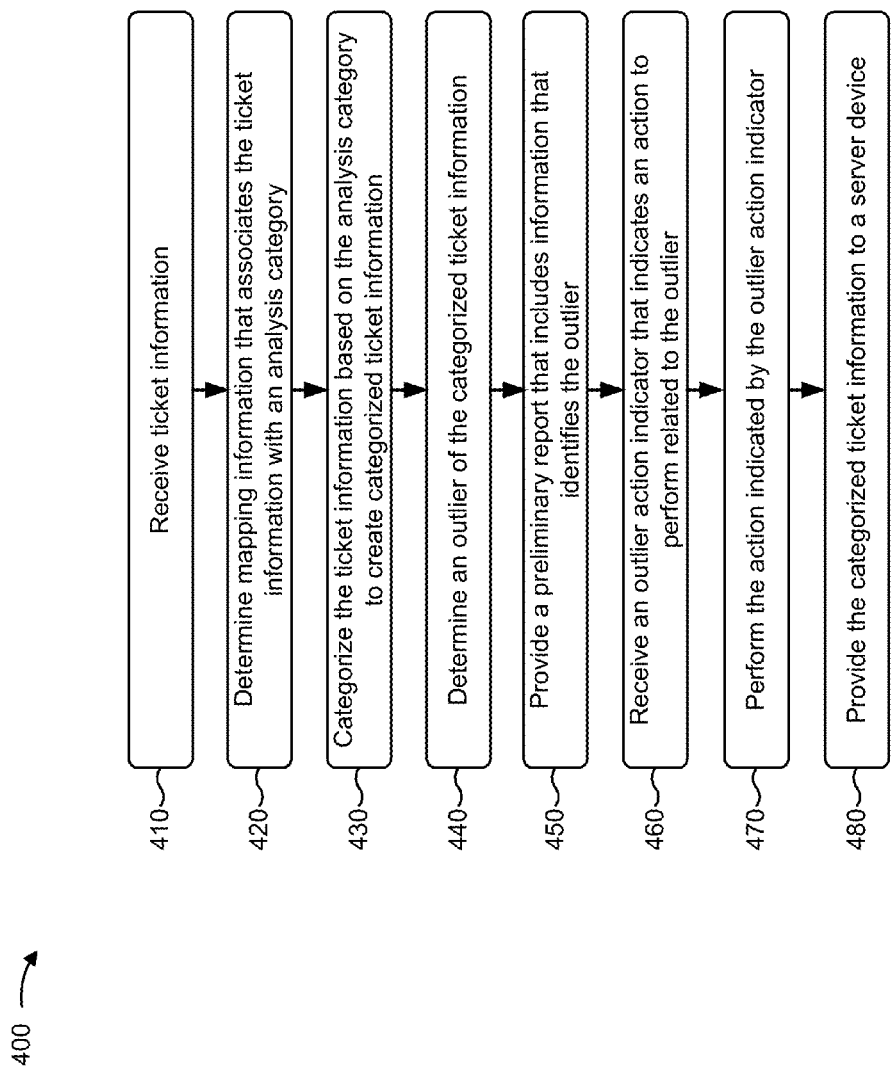

Analytics Device

Data Converter | Generate Report | Project Demographics | Preview Upload | Client Analysis | Org Analysis

Select Key Parameters

Data Source: User device
Client: Acme
Project: Project1
Select a file to upload: Info.dat  Browse...

Service Window
Shift Start Time: 08:30
Shift End Time: 18:30
Working Days: 5

Additional Key Parameters
Geography: APAC
Technology: .net
Work Type: Infrastructure Outsourcing
Ticket category: Incident Field Mapping | Data Mapping | SLA Configuration | Effort Data Capture

507

Please enter Average Resolution Effort per Priority/Ticket/Month below in minutes Year: 2012

| Priority Year/Month | Mar | Apr | May |
|---|---|---|---|
| P1 |  | 891.00 |  |
| P2 |  | 432.00 | 458.00 |
| P3 | 159.00 | 600.00 |  |
| P4 |  |  |  |
| P5 |  |  |  |
| P6 |  |  |  |
| P7 |  |  |  |

Categorize  Reset

Save  Reset

| | | | | | | | |
|---|---|---|---|---|---|---|---|
| Analytics Device | | | | | | | |
| Data Converter | Generate Report | Project Demographics | Preview Upload | Client Analysis | Org Analysis | | |

Select Key Parameters

Data Source: Acme ▼   Project: Project1 ▼   Select a file to upload: Browse... Extract

Service Window

Shift Start Time: 08:30 ▼   Shift End Time: 18:30 ▼   Working Days: 5 ▼

Additional Key Parameters

Geography: APAC ▼   Technology: .Net ▼   Work Type: Application Maintenance ▼

| Field Mapping | Data Mapping | SLA Configuration | Effort Data Capture |
|---|---|---|---|

515 — Source Fields: ☑ Priority ✓ ☑ Status ✓ ☑ SLA Response ✓ ☑ SLA Resolution

Destination Fields: P4, P5, P6, P7

Final Mapping: P2 → 2, P3 → 3, P1 → 1    — 516

[ Map > ]  [ Clear < ]    [ Categorize ]  [ Reset ]

Preliminary Report

Convert Data (3433)

517 —

| Incident Number | Priority | Status | Reported Date | Last Resolved Date | SLA Resolution |
|---|---|---|---|---|---|
| 88902034 | P2 | Closed | 6/21/2013 5:05:20 AM | 6/21/2013 5:05:20 AM | Met |
| 90297959 | P2 | Closed | 7/26/2013 9:59:35 AM | 7/26/2013 9:59:35 AM | Met |
| 90618336 | P2 | Closed | 8/22/2013 9:33:38 PM | 8/22/2013 9:33:38 PM | Met |

1 2 3 4 5 6 7 8 9 10...    [ Export to Spreadsheet ]

Outliers

518 —

| Incident Number | Priority | Status | Reported Date | Last Resolved Date | SLA Resolution |
|---|---|---|---|---|---|
| 90594435 | P2 | Closed | 7/26/2013 9:59:35 AM | 8/23/2013 8:56:55 AM | Met |
| 90542439 | P2 | Closed | 7/26/2013 9:59:35 AM | 8/23/2013 7:22:55 AM | Met |
| 88158028 | P2 | Closed | 5/21/2013 7:19:08 AM | 6/18/2013 7:09:34 AM | Met |

1 2 3 4 5 6 7 8 9 10...    [ Export to Spreadsheet ]

500

| Incident # | Priority | Status | Reported Date | Last Resolved Date | SLA Resolution | Reason |
|---|---|---|---|---|---|---|
| 20054886 | P2 | Resolved | 10/9/2012 15:56 | 10/29/2012 0:00 | Met | Resolution time is much higher that other tickets in same priority |
| 19981404 | P2 | Resolved | 10/4/2012 15:10 | 10/24/2012 0:00 | Met | Resolution time is much higher that other tickets in same priority |
| 20746657 | P2 | Resolved | 11/21/2012 14:59 | 12/11/2012 0:00 | Met | Resolution time is much higher that other tickets in same priority |
| 20095148 | P2 | Resolved | 10/11/2012 14:42 | 10/31/2012 0:00 | Missed | Resolution time is much higher that other tickets in same priority |
| 19792545 | P2 | Resolved | 9/24/2012 14:11 | 10/12/2012 0:00 | Missed | Resolution time is much higher that other tickets in same priority |

FIG. 6A

Preliminary Report 610

Convert Data (3433)

| Incident Number | Priority | Status | Reported Date | Last Resolved Date | SLA Resolution |
|---|---|---|---|---|---|
| 88902034 | P2 | Closed | 6/21/2013 5:05:20 AM | 6/21/2013 5:05:20 AM | Met |
| 90297959 | P2 | Closed | 7/26/2013 9:59:35 AM | 7/26/2013 9:59:35 AM | Met |
| 90618336 | P2 | Closed | 8/22/2013 9:33:38 PM | 8/22/2013 9:33:38 PM | Met |

1 2 3 4 5 6 7 8 9 10...

Export to Spreadsheet

Outliers (Excluded by default. Select to include.) (866) 620

| | Incident Number | Priority | Status | Reported Date | Last Resolved Date | SLA Resolution |
|---|---|---|---|---|---|---|
| ☐ | 90594435 | P2 | Closed | 7/26/2013 9:59:35 AM | 8/23/2013 8:56:55 AM | Met |
| ☐ | 90542439 | P2 | Closed | 7/26/2013 9:59:35 AM | 8/23/2013 7:22:55 AM | Met |
| ☑ | 88158028 | P2 | Closed | 5/21/2013 7:19:08 AM | 6/18/2013 7:09:34 AM | Met |

1 2 3 4 5 6 7 8 9 10...

Export to Spreadsheet

[Merge ALL Outliers] [Merge Selected] [Undo Merge] — 630

[Prepare Preview] — 640

SERVICE TICKET ANALYSIS USING AN ANALYTICS DEVICE

RELATED APPLICATION

This application claims priority under 35 U.S.C. §119 to Indian Provisional Patent Application No. 5713/CHE/2014, filed on Nov. 13, 2014, the content of which is incorporated by reference herein in its entirety.

BACKGROUND

An application provider (e.g., a business, an organization, or the like) may provide an application (e.g., an online application, a computer application, or the like). The organization may manage the implementation and operation of the application, or may outsource management of the implementation and operation of the application to an application manager. The application manager may process various formats, types, and amounts of data while implementing and operating the application.

SUMMARY

According to some possible implementations, a device may receive ticket information associated with one or more service tickets. The ticket information may include a ticket category and ticket data associated with the one or more service tickets. The ticket data may be associated with the ticket category. The ticket data may describe information related to resolving the one or more service tickets. The device may identify, based on the ticket category or the ticket data, an association between the ticket category and an analysis category. The analysis category may be used to analyze the ticket information. The device may generate categorized ticket information based on the analysis category and the ticket information. The categorized ticket information may include the ticket data, and the ticket data may be associated with the analysis category. The device may provide the categorized ticket information.

According to some possible implementations, a computer-readable medium may store instructions that, when executed by a processor, cause the processor to receive ticket information associated with one or more service tickets. The ticket information may include a ticket category and ticket data associated with the one or more service tickets. The ticket category may be associated with the ticket data, and the ticket data may describe information related to resolving the one or more service tickets. The instructions may cause the processor to identify, based on the ticket category or the ticket data, an analysis category associated with the ticket category. The instructions may cause the processor to generate categorized ticket information based on the analysis category and the ticket information. The categorized ticket information may include the ticket data, and the ticket data may be associated with the analysis category. The instructions may cause the processor to analyze the categorized ticket information to determine analysis information. The instructions may cause the processor to generate an analysis report that describes the analysis information, and to provide, for display, the analysis report.

According to some possible implementations, a method may include receiving, by a device, ticket information associated with one or more service tickets. The ticket information may include a ticket category and ticket data associated with the one or more service tickets. The ticket data may be associated with the ticket category, and the ticket data may describe information related to resolving the one or more service tickets. The method may include identifying, by the device and based on the ticket category or the ticket data, an association between the ticket category and an analysis category. The analysis category may be used to analyze the ticket information. The method may include generating, by the device, categorized ticket information based on the analysis category and the ticket information. The categorized ticket information may include the ticket data, and the ticket data may be associated with the analysis category. The method may include determining, by the device and based on the ticket data, an outlier of the categorized ticket information. The method may include providing, by the device, an outlier report that includes information identifying the outlier. The outlier report may request an outlier action indicator that indicates an action for the device to perform related to the outlier. The method may include selectively removing or including, by the device and based on the action indicated by the outlier action indicator, the outlier with the categorized ticket information. The method may include providing, by the device, the categorized ticket information.

BRIEF DESCRIPTION OF THE DRAWINGS

FIG. 4 is a flow chart of an example process for categorizing ticket information and processing outliers;

FIGS. 5A-5E are diagrams of an example implementation relating to the example process shown in FIG. 4;

FIGS. 6A-6C are diagrams of another example implementation relating to the example process shown in FIG. 4;

FIGS. 8A-8D are diagrams of an example implementation relating to the example process shown in FIG. 7.

DETAILED DESCRIPTION

Figure 1A:
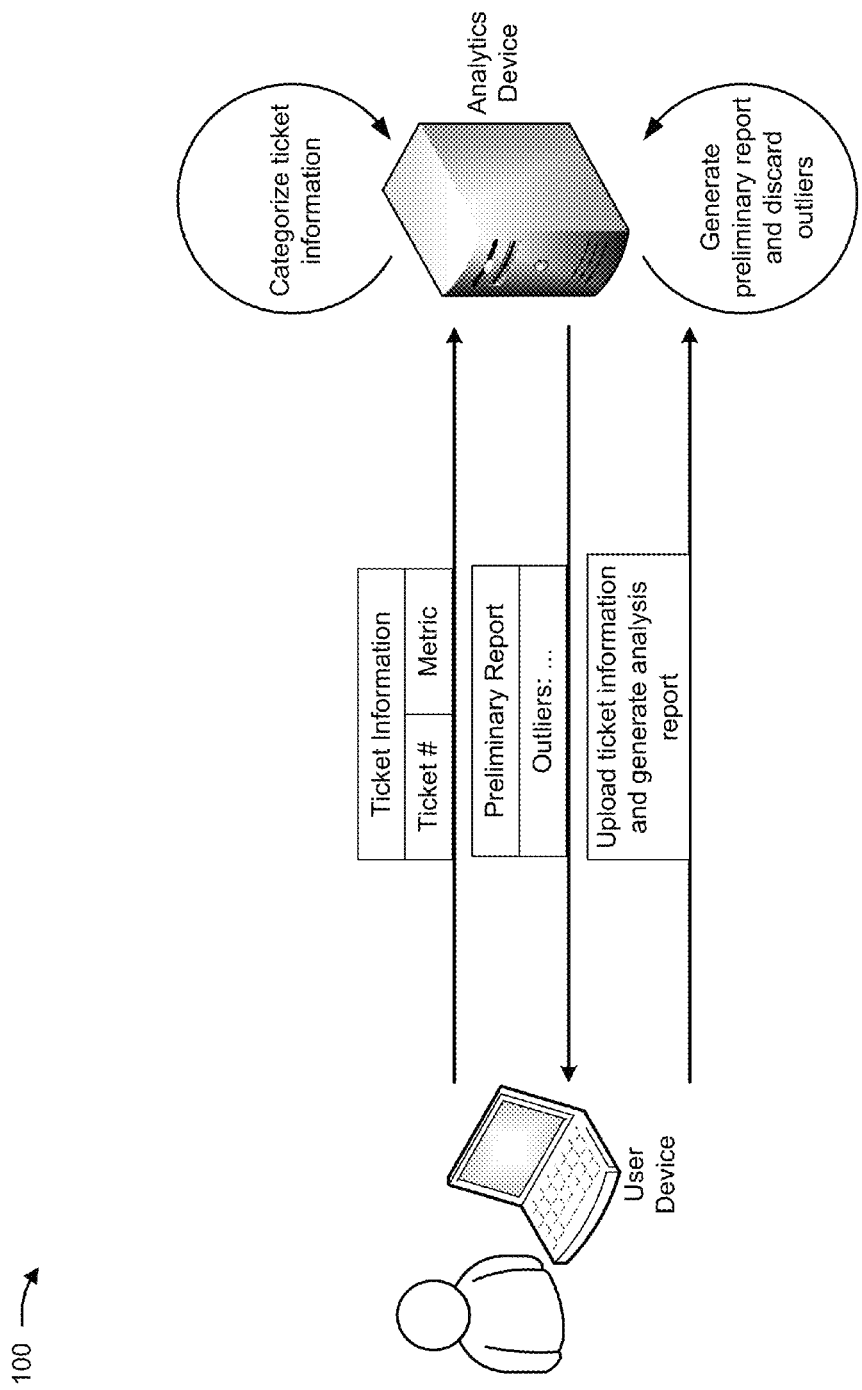
FIGS. 1A and 1B are diagrams of an overview of an example implementation described herein.

The following detailed description of example implementations refers to the accompanying drawings. The same reference numbers in different drawings may identify the same or similar elements.

An application provider may provide an application via a user device, a server device, or the like. The application provider may manage the implementation and/or operation of the application (e.g., by employing information technology specialists), or may outsource the implementation and/or operation of the application (e.g., by entering into an application outsourcing (AO) contract with an application manager). The application manager may manage the implementation and/or operation of the application using a service management tool.

The application provider may provide, to the application manager and using the service management tool, a service ticket that describes an issue related to the application (e.g., a service delay, a service outage, or the like). Based on the service ticket, the application manager may resolve the issue. Different issues may be associated with different levels of urgency (e.g., an outage that affects all users of a particular application may be associated with a higher level of urgency than an outage that affects a portion of users). The application provider and the application manager may agree on a level of service for issues associated with different levels of urgency (e.g., the level of service may prescribe a target time to respond to and/or resolve a service ticket associated with a particular level of urgency, or the like). A priority level of the service ticket, associated with the level of urgency of the issue, may be indicated by the service ticket (e.g., by a priority indicator associated with the service ticket, or the like).

The application manager may wish to analyze ticket information (e.g., may wish to determine an average response time to a particular priority level of service ticket, an average response time to service tickets originating from a particular geographic area, an average response time to service tickets from a particular industry, or the like) to assess performance in responding to and/or resolving service tickets. However, the application manager may manage a variety of applications that provide service tickets via a variety of service management tools. For example, a first application provider may provide service tickets that include information in a different format than a second application provider. Further, the application manager may not use a unified platform to analyze a variety of service tickets from different application providers and in different formats.

Implementations described herein may assist the application manager in gathering and analyzing ticket information. The application manager may provide, to an analytics device, a batch of ticket information (e.g., in a spreadsheet, or the like). The batch of ticket information may include a variety of ticket data (e.g., a ticket number, a ticket priority, a date and time a service ticket was received, a date and time a service ticket was resolved, a status of a service ticket, or the like) or a user-defined category of ticket data (e.g., a category of ticket data associated with a particular client, application, and/or project that the user wants to analyze). The analytics device may categorize the ticket information to create categorized ticket information.

The analytics device may provide the categorized ticket information to a server device (e.g., a server device that stores other categorized ticket information previously provided by the analytics device or another device). The analytics device may analyze the categorized ticket information stored by the server device to generate an analysis report (e.g., the analytics device may determine and/or remove outliers, may group tickets by a particular metric and/or a stratification parameter, may produce a graphical representation of the categorized ticket information, or the like). The analytics device may provide the categorized ticket information and the analysis report to the application manager or another party, such as the application provider. The application manager or other party may interact with the analysis report to cause additional analysis of the categorized ticket information to be provided (e.g., the analytics device may provide additional information, may determine and provide different information, or the like).

In this way, the analytics device may categorize ticket information of different data formats and origins, and may provide an interactive analysis report to the application manager based on categorized ticket information. This may aid the application manager in storing and analyzing categorized ticket information using a single device, rather than requiring multiple, different devices to analyze different types and formats of ticket information.

Figure 1B:
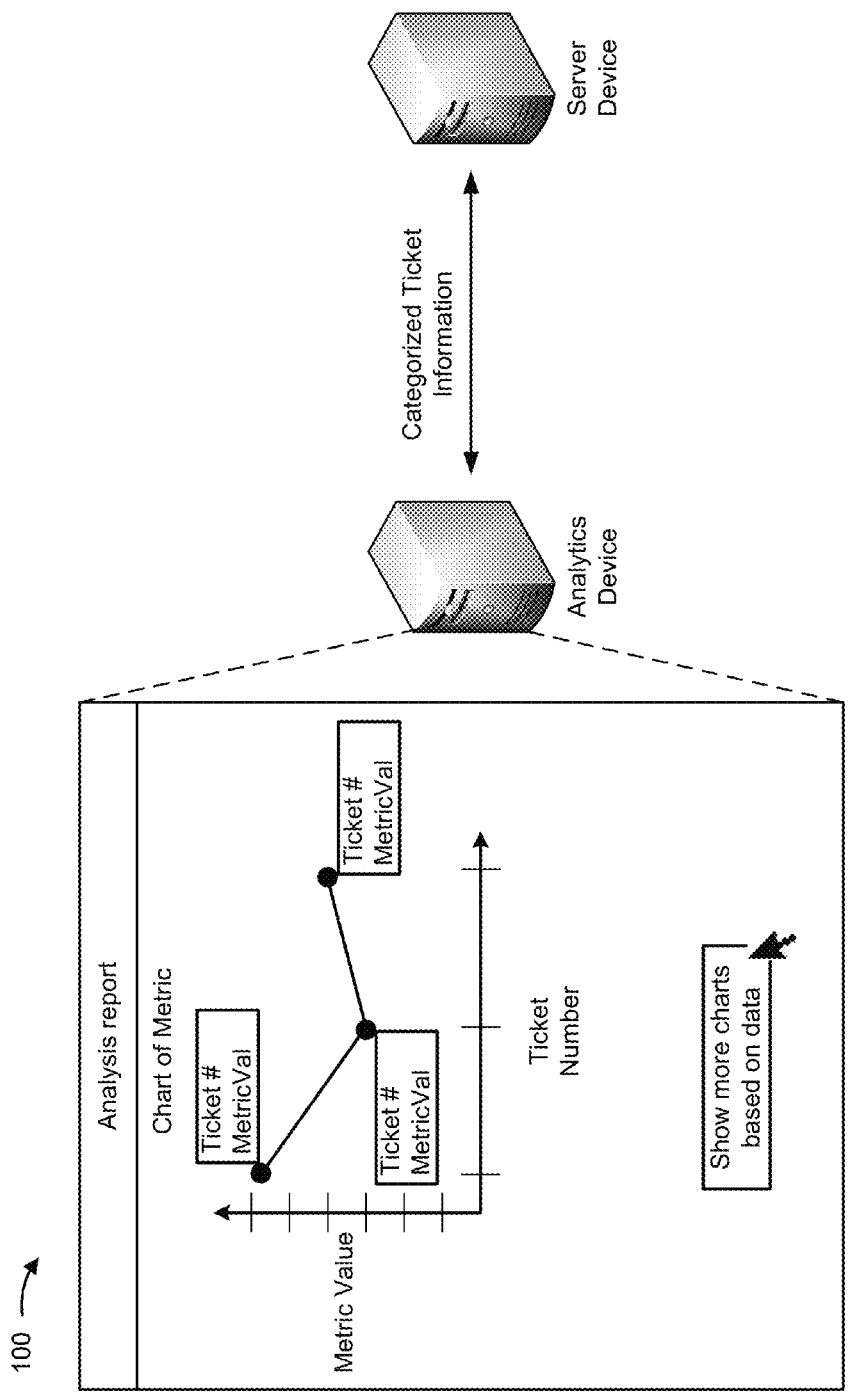

FIGS. 1A and 1B are diagrams of an overview of an example implementation 100 described herein. For the purpose of FIGS. 1A and 1B, assume that a user (e.g., an application manager) compiles a batch of ticket information including a ticket number (shown as Ticket #) and a metric related to service tickets.

As shown in FIG. 1A, a user device may provide a batch of ticket information to an analytics device. As further shown, the analytics device may categorize the batch of ticket information to create categorized ticket information. The analytics device may further generate a preliminary report and may discard one or more outliers of the categorized ticket information. In some implementations, the analytics device may not discard the one or more outliers (e.g., the analytics device may store the one or more outliers locally, may provide the one or more outliers to a server device, or the like). As further shown, the analytics device may provide a preliminary report to the user device. The preliminary report may include information that describes the one or more outliers. As further shown, the user device may transmit, to the analytics device, a request to upload and analyze the categorized ticket information. Assume that the analytics device analyzes the categorized ticket information.

As shown in FIG. 1B, the analytics device may generate an analysis report based on analyzing the categorized ticket information. In some implementations, the analytics device may provide the analysis report to another device, such as the user device. As shown, the analysis report may include graphical information that describes the categorized ticket information. As further shown, the analysis report may facilitate a user interaction to generate further analysis information (e.g., by a user interaction with a "Show more charts based on data" button, a user interaction with an element of the graphical information, or the like). As shown, the analytics device may provide the categorized ticket information to a server device for storage.

In this way, the analytics device may receive ticket information from a user device. The analytics device may process the ticket information by determining one or more outliers and by categorizing the ticket information, and may generate and/or provide an interactive analysis report based on the categorized ticket information. By interacting with the analysis report, a user may cause the analytics device to perform additional analysis and/or provide different information. In this way, the analytics device may aid the user in understanding ticket information, which may improve the user's management of the application.

Figure 2:
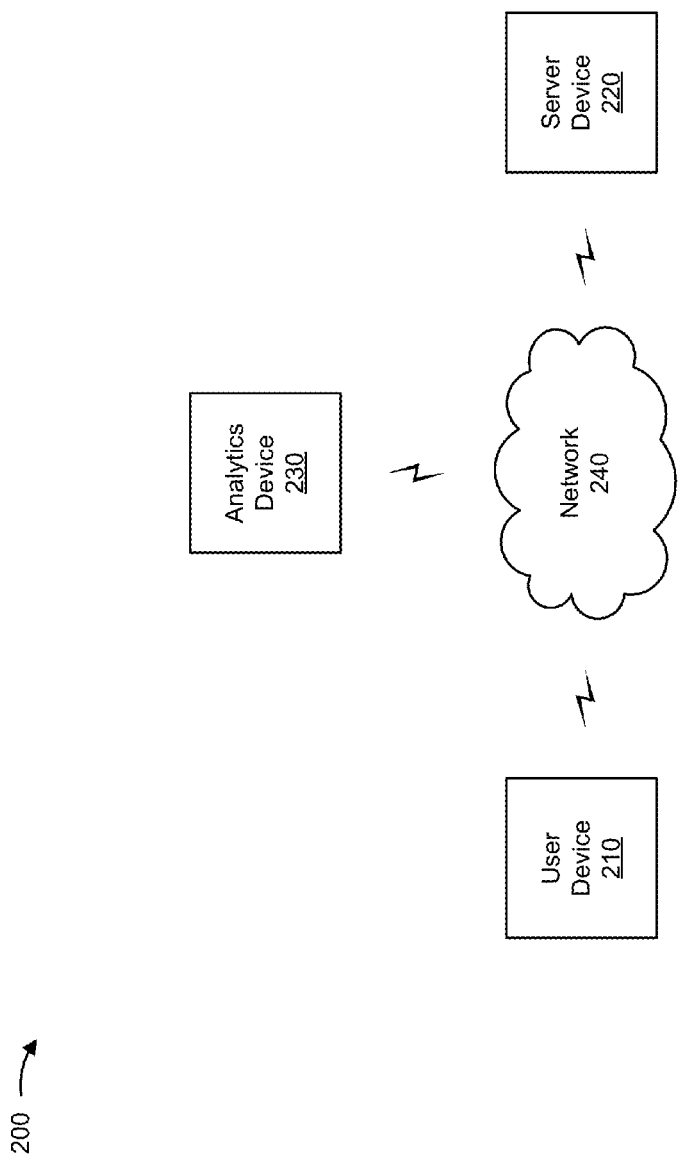
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a server device 220, an analytics device 230, and a network 240. Devices of environment 200 may interconnect via wired connections, wireless connections, or a combination of wired and wireless connections.

User device 210 may include one or more devices capable of receiving, generating, storing, processing, and/or providing ticket information. For example, user device 210 may include a communication and/or computing device, such as a laptop computer, a tablet computer, a handheld computer, or a similar type of device. In some implementations, user device 210 may allow a user to access, view, and/or interact with analytics device 230 (e.g., via a user interface) in order to format, approve, preview, upload, etc. ticket information, in order to generate, access, view, or interact with an analysis report, or the like.

Server device 220 may include one or more devices capable of receiving, generating, storing, processing, and/or providing information. For example, server device 220 may include a server or a similar device. In some implementations, server device 220 may store and/or access ticket information (e.g., captured using a service management tool) to be provided to analytics device 230. In some implementations, server device 220 may analyze stored ticket information to generate analysis information, and may provide the analysis information to analytics device 230 or another device.

Analytics device 230 may include one or more devices capable of receiving, generating, storing, processing, and/or providing information associated with analyzing ticket information. For example, analytics device 230 may include a server device or a collection of server devices. In some implementations, analytics device 230 may analyze ticket information. Additionally, or alternatively, analytics device 230 may generate and/or provide an analysis report associated with analyzing ticket information. In some implementations, analytics device 230 may determine mapping information, and may use the mapping information to generate categorized ticket information based on ticket information.

Network 240 may include one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
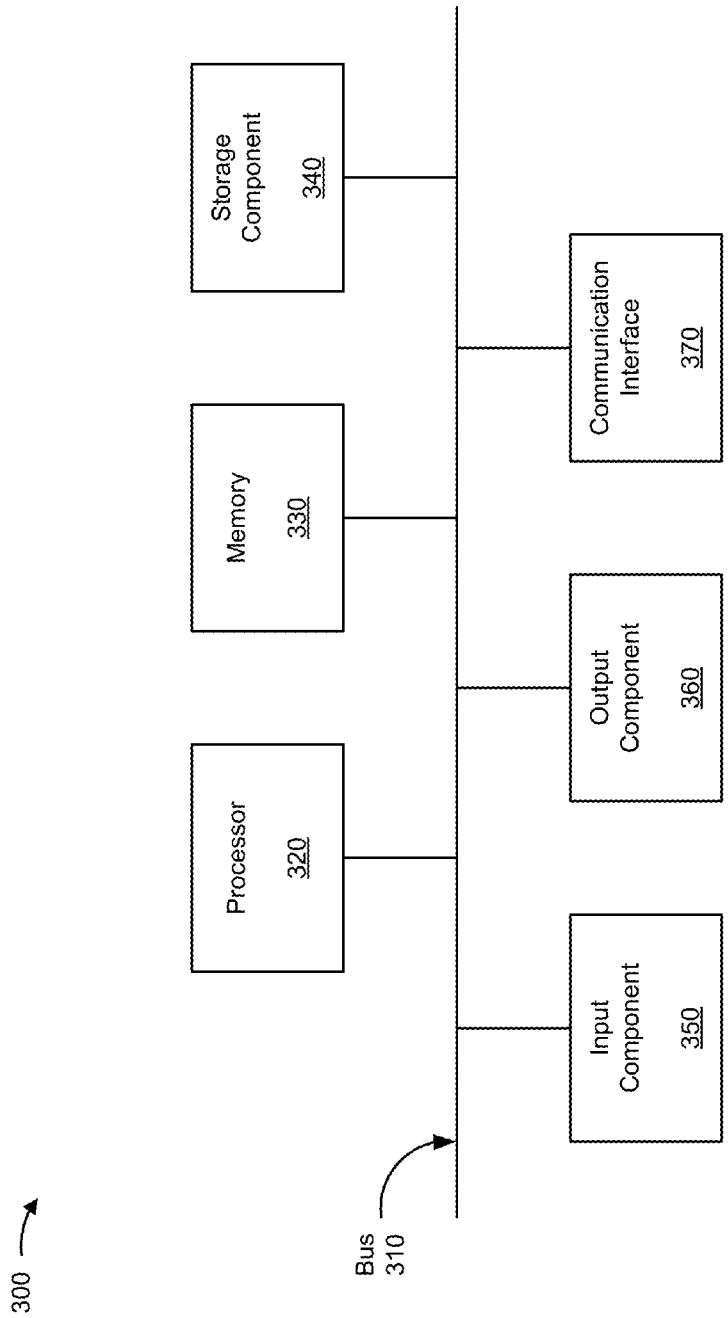
FIG. 3 is a diagram of example components of one or more devices of FIG. 2.

FIG. 3 is a diagram of example components of a device 300. Device 300 may correspond to user device 210, server device 220, and/or analytics device 230. In some implementations, user device 210, server device 220, and/or analytics device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for categorizing ticket information and processing outliers. In some implementations, one or more process blocks of FIG. 4 may be performed by analytics device 230. In some implementations, one or more process blocks of FIG. 4 may be performed by another device or a set of devices separate from or including analytics device 230, such as user device 210 and/or server device 220.

As shown in FIG. 4, process 400 may include receiving ticket information (block 410). For example, analytics device 230 may receive ticket information (e.g., from user device 210 or another device). The ticket information may include information related to service tickets. In some implementations, the ticket information may be provided by user device 210 (e.g., the ticket information may be uploaded, emailed, etc. to analytics device 230 by user device 210). Additionally, or alternatively, the ticket information may be provided by another device (e.g., server device 220). In some implementations, the ticket information may be stored in a data structure (e.g., a spreadsheet, or the like). In some implementations, the ticket information may include information related to multiple, different users, application, and/or projects.

In some implementations, the ticket information may include information identifying a user, an application, and/or a project associated with the ticket information (e.g., a client identifier that identifies a particular client or user, a project identifier that identifies a particular project, a start date of the particular project, a start time of a shift, an end time of the shift, a number of days in a week that the shift occurs, a geographical location identifier, an operating group identifier, a team size identifier, a technology identifier that identifies a technology associated with the user or the application, or the like). In some implementations, the ticket information may include a project profile identifier (e.g., information identifying a particular project to which the ticket information is related) corresponding to a project profile stored by analytics device 230. In some implementations, the ticket information may include a client profile identifier (e.g., information identifying a particular client to which the ticket information is related), corresponding to a client profile stored by analytics device 230.

In some implementations, the ticket information may include ticket data. The ticket data may include resolution information related to resolving a ticket, such as a ticket resolution status, a priority category (e.g., a category for a priority identifier that identifies a priority level of a ticket), a date of receipt of the ticket, a date of resolution of the ticket, or the like. In some implementations, the ticket data may be provided in association with a user-defined category (e.g., the ticket data and the user-defined category may be provided as part of a single file).

In some implementations, the ticket information may be associated with a user-defined category. The user-defined category may include information related to analyzing ticket data, such as a project name category, an application name category, a line of business category, an "effort in minutes" category (e.g., a category for ticket information that describes an amount of time spent evaluating, processing, and/or resolving a ticket), a last modified date category (e.g., a category for ticket information that describes a date on which the ticket information was last modified), a ticket type category (e.g., an incident ticket type, a problem ticket type, a work request ticket type, etc.), or the like. A user may define a user-defined category to be associated with ticket information that is unique to a particular project, application, and/or client, and may provide the user-defined category and/or the ticket information associated with the user-defined category to analytics device 230 for analysis. In this way, analytics device 230 may facilitate storage, categorization, and analysis of ticket information that is unique to a particular project, application, and/or client.

In some implementations, the ticket information may include information related to a service level agreement (SLA). A service level agreement may be an agreement, between an application outsourcing (AO) service provider and a client, that defines a service level for providing an AO service. For example, an AO service provider may agree with a client to provide a first service level in association with a first priority level of ticket, a second service level in association with a second priority level of ticket, and so on. The ticket information may define an SLA response category (e.g., that includes information related to whether the AO service provider achieved the agreed-upon service level in association with a response to a ticket), an SLA resolution category (e.g., that includes information related to whether the AO service provider achieved the agreed-upon service level in association with a resolution of a ticket), or another category related to an SLA. In some implementations, the information related to the SLA may be optional (e.g., analytics device 230 may not require the SLA ticket information to perform the AO analysis).

In some implementations, the ticket information may include effort data. Effort data may include information describing an average effort in resolving a batch of service tickets (e.g., an average time spent resolving a batch of service tickets, or the like). In some implementations, the effort data may be determined based on an effort per individual service ticket. Additionally, or alternatively, the effort data may be determined based on an aggregation (e.g., average effort data for a batch of service tickets, or the like). In some implementations, the effort data may be defined in terms of a full-time equivalent (FTE) unit (e.g., a unit of time equivalent to a time input by a full-time worker).

In some implementations, the ticket information may include information related to an open service ticket (e.g., an unresolved service ticket). For example, analytics device 230 may receive ticket information that describes one or more service tickets that have not been resolved (e.g., the one or more service tickets may not be associated with resolution information, effort data, a date of resolution, or the like). In some implementations, analytics device 230 may ensure that the ticket information of the one or more service tickets does not include the resolution information, the effort data, or the date of resolution.

In some implementations, the ticket information may be provided via a user interface (e.g., based on a user interaction with a drop down menu, based on a user entering information in an input field, etc.). For example, assume that analytics device 230 receives a batch of ticket information related to a particular project called "Project1." Assume further that analytics device 230 has previously received other ticket information related to Project1. Rather than requiring the ticket information to include information identifying Project1, analytics device 230 may provide a user interface feature allowing a user to identify a project profile of Project1 (e.g., a drop down menu that includes a "Project1" option, based on analytics device 230 having previously created a project profile associated with Project1). In this way, analytics device 230 may receive ticket information via a user interface.

In some implementations, analytics device 230 may provide an input field in association with a user interface based on not receiving particular ticket information. For example, assume that analytics device 230 requires particular ticket information in order to analyze a batch of ticket information. Assume further that the particular ticket information is not included with the batch of ticket information. In that case, analytics device 230 may determine that the particular ticket information is not included with the batch of ticket information. Analytics device 230 may further provide, for display in association with a user interface, an input field that facilitates input of the particular ticket information. In this way, analytics device 230 may ensure that particular ticket information is provided, in order to properly analyze the batch of ticket information.

As further shown in FIG. 4, process 400 may include determining mapping information that associates the ticket information with an analysis category (block 420). For example, analytics device 230 may determine mapping information that associates the ticket information with an analysis category. In some implementations, analytics device 230 may determine the mapping information without user input (e.g., analytics device 230 may automatically determine the mapping information, rather than receiving user input that identifies the mapping information). Additionally, or alternatively, analytics device 230 may receive the mapping information (e.g., based on user input, from user device 210, from server device 220, or the like).

In some implementations, the mapping information may be associated with required ticket information. For example, assume that analytics device 230 requires particular ticket information, associated with a particular analysis category, to analyze the ticket information (e.g., analytics device 230 may require a ticket resolution status, a priority level of a service ticket, a date of receipt of a service ticket, a date of response to a service ticket, or the like, to perform the analysis). In this case, the mapping information may specify that the particular analysis category is required. Analytics device 230 may only accept a batch of ticket information that includes ticket data associated with the particular analysis category based on the mapping information. In some implementations, analytics device 230 may provide, for display, an indication that the particular analysis category is required (e.g., an "x" next to a name of the particular analysis category, or the like). Upon receiving the particular ticket information associated with the particular analysis category, analytics device 230 may provide, for display, an indication that analytics device 230 received the particular ticket information (e.g., a check mark next to the name of the particular analysis category, or the like). In this way, analytics device 230 may ensure that required ticket information is provided by user device 210.

In some implementations, the mapping information may be associated with optional ticket information. For example, assume that optional ticket information is not required by analytics device 230 to analyze a batch of ticket information, but may be used by analytics device 230 to perform additional analysis (e.g., the optional ticket information may be associated with a user-defined category, or the like). Analytics device 230 may define an optional analysis category for the optional ticket information (e.g., based on an input received from user device 210, or the like). Mapping information may associate the optional ticket information and the optional analysis category. Upon receiving the optional ticket information, analytics device 230 may perform the additional analysis (e.g., based on a user interaction, or the like). In this way, analytics device 230 may provide additional analysis based on optional ticket information and/or a user-defined category of ticket information.

In some implementations, an analysis category may match a ticket information category. For example, assume that particular ticket information is associated with a ticket information category named "Shift Start Time." Assume further that an analysis category is named "Shift Start Time." Based on determining that the name of the ticket information category matches the name of the analysis category, analytics device 230 may automatically determine mapping information that associates the ticket information category and the analysis category (e.g., without user input).

In some implementations, analytics device 230 may fail to automatically determine mapping information. For example, assume that analytics device 230 fails to determine mapping information (e.g., fails to automatically match a ticket information category to an analysis category). In that case, analytics device 230 may provide an indication of the failure to determine the mapping information. Analytics device 230 may further receive the mapping information from another device (e.g., from user device 210, based on the indication of the failure to determine the mapping information). In some implementations, the mapping information may be received via a user interface (e.g., a user may indicate an association between an analysis category and a ticket information category via the user interface).

As further shown in FIG. 4, process 400 may include categorizing the ticket information based on the analysis category to create categorized ticket information (block 430). For example, analytics device 230 may categorize the ticket information, based on the analysis category and the mapping information, to create categorized ticket information. In some implementations, analytics device 230 may rearrange the categorized ticket information (e.g., may group related categorized ticket information, or the like). In this way, analytics device 230 may provide ticket information to server device 220 in a standardized and more easily analyzed format, thus improving performance of server device 220 and analytics device 230.

As further shown in FIG. 4, process 400 may include determining an outlier of the ticket information (block 440). For example, analytics device 230 may determine an outlier of the categorized ticket information. In some implementations, analytics device 230 may determine the outlier based on a statistical analysis (e.g., based on a standard deviation, or the like). In some implementations, analytics device 230 may determine the outlier based on a user input (e.g., a user may specify, via user device 210, a threshold value to define an outlier, a range of values to define the outlier, etc.).

An outlier may include ticket information that varies (e.g., by a particular threshold) from a particular metric of the ticket information. For example, assume that ten service tickets are each associated with a turnaround time between fifty hours and one hundred hours. Assume further that an eleventh service ticket is associated with a turnaround time of six hundred hours. Analytics device 230 may determine that the eleventh service ticket is an outlier based on the turnaround time associated with the eleventh service ticket being outside of the range of the other ten service tickets. In some implementations, analytics device 230 may determine multiple, different outliers of a batch of ticket information. In some implementations, an outlier may be caused by a process variation (e.g., an uncontrollable variable in a process that may cause the particular metric of the ticket information to vary, or the like), a client action (e.g., a client failing to submit a service ticket for a period of time after generating the service ticket), a natural cause (e.g., a natural disaster, or the like, that delays resolution of a service ticket), or the like.

In some implementations, analytics device 230 may determine an outlier based on a statistical analysis. For example, analytics device 230 may determine a statistical measure of a batch of ticket information (e.g., a standard deviation of the batch of ticket information, a variance of the batch of ticket information, or the like). Analytics device 230 may determine one or more outliers based on the statistical measure (e.g., if a particular ticket of the batch of ticket information is not within the standard deviation, analytics device 230 may determine the particular ticket to be an outlier). In this way, analytics device 230 may determine an outlier of a batch of ticket information without receiving a definition of the outlier.

In some implementations, analytics device 230 may categorize an outlier. For example, assume that analytics device 230 determined an outlier based on a geographical location (e.g., a particular service ticket, associated with a geographical location that is different than the geographical locations that are associated with other service tickets, was determined to be an outlier). Analytics device 230 may categorize the outlier based on the geographical location. As another example, assume that analytics device 230 determines an outlier based on a time of resolution (e.g., another particular service ticket, associated with a time of resolution that is different than the times of resolution that are associated with other service tickets, was determined to be an outlier). Analytics device 230 may categorize the outlier based on the time of resolution. In this way, analytics device 230 may determine, categorize, and store outliers, which may aid the user in analyzing the outliers (e.g., to determine a cause of the outliers, or the like).

In some implementations, analytics device 230 may determine an outlier based on a user input. For example, assume that a user wants to define as an outlier any service ticket associated with a turnaround time greater than three hundred hours. User device 210 may provide a rule, to analytics device 230, that analytics device 230 is to determine that any service ticket associated with a turnaround time greater than three hundred hours is an outlier. Based on the rule, analytics device 230 may determine that one or more service tickets associated with turnaround times greater than three hundred hours are outliers, and may process the one or more service tickets accordingly. In this way, analytics device 230 may determine one or more outliers based on a rule provided by a user, and thus may more effectively analyze the ticket information based on a preference of the user.

As further shown in FIG. 4, process 400 may include providing a preliminary report that includes information that identifies the outlier (block 450). For example, analytics device 230 may prepare and/or provide a preliminary report that describes the ticket information. The preliminary report may include information that identifies the outlier. In some implementations, analytics device 230 may provide the preliminary report to user device 210 (e.g., for display via a user interface of user device 210).

In some implementations, the preliminary report may provide a preview of an upload (e.g., based on a user interaction, automatically, or the like). For example, assume that user device 210 provides a batch of ticket information to analytics device 230 to upload to server device 220. Assume further that analytics device 230 has created categorized ticket information. In some implementations, before uploading the categorized ticket information to server device 220, analytics device 230 may provide a preview of the categorized ticket information to be uploaded. In this way, analytics device 230 may ensure that a user is capable of previewing the categorized ticket information before providing the categorized ticket information to server device 220 (e.g., to ensure that the categorized ticket information is accurate).

The preview of the categorized ticket information may include information related to the categorized ticket information (e.g., an incident number, a priority indicator, a ticket status indicator, an indicator of a reported date, an indicator of a resolved date, an indicator of a responded date, an SLA resolution status, an SLA response status, or the like). In some implementations, analytics device 230 may provide the preview of the categorized ticket information automatically (e.g., analytics device 230 may always provide the preview of the categorized ticket information before uploading the categorized ticket information to server device 220). Additionally, or alternatively, analytics device 230 may provide the preview of the categorized ticket information based on a user interaction (e.g., a user may request, via a user interface of user device 210, that analytics device 230 provide the preview of the categorized ticket information).

In some implementations, the preliminary report may include a graphical representation of the categorized ticket information. For example, the preliminary report may provide a user interface (e.g., for display via user device 210). The user interface may facilitate a user interaction to request a graphical representation of the categorized ticket information. Based on a user interaction with the graphical interface, analytics device 230 may provide a graphical representation of the categorized ticket information. In this way, analytics device 230 may present categorized ticket information in a more easily understood and accessible format, by providing a graphical representation of the categorized ticket information.

In some implementations, the graphical representation of the categorized ticket information may include an outlier. For example, assume that analytics device 230 has determined an outlier of a batch of categorized ticket information. Assume further that analytics device 230 receives an indicator to include the outlier in the graphical representation of the batch of categorized ticket information (e.g., via an "include outlier" check box of the user interface, or the like). Based on receiving the indicator to include the outlier, analytics device 230 may include the outlier in the graphical representation of the categorized ticket information. In this way, analytics device 230 may provide a graphical representation of categorized ticket information that includes an outlier, to aid a user in understanding the relationship of the categorized ticket information to the outlier (e.g., a relative magnitude of the outlier compared to the categorized ticket information, or the like).

Additionally, or alternatively, analytics device 230 may not include an outlier in the graphical representation of the categorized ticket information. For example, assume that analytics device 230 receives an indication not to include an outlier in the graphical representation of the categorized ticket information. Based on receiving the indication not to include the outlier, analytics device 230 may prevent the outlier from being included in the graphical representation of the categorized ticket information. In this way, analytics device 230 may provide a graphical representation of categorized ticket information not including an outlier, which may aid a user in understanding, processing, and/or visualizing the categorized ticket information.

In some implementations, the preliminary report may include information that identifies an outlier. For example, after determining an outlier of a batch of ticket information, analytics device 230 may include information that identifies the outlier in the preliminary report. The preliminary report may indicate one or more actions that analytics device 230 may take related to the outlier (e.g., the preliminary report may define an outlier action indicator, which is described in more detail elsewhere herein). In some implementations, the information identifying the outlier may identify a reason for the outlier. For example, assume that analytics device 230 determines that a particular service ticket is an outlier based on the service ticket being associated with a resolution time that is higher than other service tickets of a similar priority level. Analytics device 230 may provide, with the preliminary report, information that identifies the outlier and a reason that the particular outlier was determined. In this way, analytics device 230 may provide information identifying outliers and reasons the outliers were determined, to assist a user in evaluating the ticket information.

As further shown in FIG. 4, process 400 may include receiving an outlier action indicator that indicates an action to perform related to the outlier (block 460). For example, analytics device 230 may receive, from user device 210, an outlier action indicator. The outlier action indicator may indicate an action to perform related to the outlier (e.g., remove the outlier from the ticket information, include the outlier with the ticket information, or the like). In some implementations, analytics device 230 may receive the outlier action indicator based on a user interaction (e.g., a user interaction with a user interface provided by user device 210).

In some implementations, the outlier action indicator may cause analytics device 230 to remove the outlier from the ticket information. For example, assume that a user wants to remove outliers from a batch of ticket information before analytics device 230 provides the ticket information to server device 220. Based on the information identifying the outlier in the preliminary report, user device 210 may provide an outlier action indicator to analytics device 230 (e.g., based on a user interaction with a user interface) that indicates that analytics device 230 is to remove the outlier. Additionally, or alternatively, the outlier action indicator may indicate that analytics device 230 is to remove all outliers from the ticket information. In this way, a user may cause analytics device 230 to remove one or more outliers from a batch of ticket information.

In some implementations, the outlier action indicator may cause analytics device 230 to include the outlier with the ticket information. For example, assume that a user of user device 210 determines that analytics device 230 incorrectly flagged an outlier (e.g., by reviewing the preliminary report). User device 210 may provide an outlier action indicator that causes analytics device 230 to include the outlier when providing the ticket information to server device 220. In this way, analytics device 230 may include an incorrectly determined outlier with a batch of ticket information, based on an outlier action indicator.

In some implementations, the outlier action indicator may cause analytics device 230 to include all outliers with the categorized ticket information. For example, assume that a user wants to include all outliers with a batch of ticket information for analytics device 230 to provide to server device 220. User device 210 may provide an outlier action indicator to analytics device 230 (e.g., based on a user interaction with a user interface) that indicates that analytics device 230 is to include all outliers with the batch of ticket information. In this way, a user may cause analytics device 230 to include all outliers with a batch of ticket information (e.g., to facilitate analysis of the outliers, or the like).

As further shown in FIG. 4, process 400 may include performing the action indicated by the outlier action indicator (block 470). For example, analytics device 230 may perform the action indicated by the outlier action indicator. In some implementations, analytics device 230 may remove one or more outliers from a batch of ticket information (e.g., if the outlier action indicator indicated that analytics device 230 is to remove a particular outlier, a group of outliers, all outliers, or the like). Additionally, or alternatively, analytics device 230 may include one or more outliers with a batch of ticket information (e.g., if the outlier action indicator indicated that analytics device 230 is to include a particular outlier, a group of outliers, all outliers, or the like).

In some implementations, analytics device 230 may include one or more outliers, and remove one or more other outliers. For example, assume that analytics device 230 receives a first outlier action indicator that indicates that analytics device 230 is to remove a first outlier from a batch of ticket information. Assume further that analytics device 230 receives a second outlier action indicator that indicates that analytics device 230 is to include a second outlier with the batch of ticket information. Based on the first and second outlier action indicators, analytics device 230 may remove the first outlier from the batch of ticket information, and may include the second outlier with the batch of ticket information. In this way, analytics device 230 may take different actions with respect to different outliers, based on one or more outlier action indicators.

As further shown in FIG. 4, process 400 may include providing the categorized ticket information to a server device (block 480). For example, analytics device 230 may provide the categorized ticket information to server device 220 (e.g., by uploading the categorized ticket information to server device 220, or the like). In some implementations, analytics device 230 may provide the categorized ticket information to server device 220 based on a user interaction (e.g., a user interaction with a user interface of user device 210).

In some implementations, analytics device 230 may provide the categorized ticket information based on an interaction with the preliminary report. For example, analytics device 230 may facilitate a user interaction with the preliminary report (e.g., via an "upload" button of a user interface displaying the preliminary report) to cause analytics device 230 to receive an upload indicator (e.g., that indicates that analytics device 230 is to provide the categorized ticket information to server device 220). Based on receiving the upload indicator, analytics device 230 may provide the categorized ticket information to server device 220 and/or another device.

In some implementations, analytics device 230 may not provide the categorized ticket information to server device 220. For example, analytics device 230 may facilitate a user interaction with the preliminary report (e.g., via a "cancel upload" button of a user interface displaying the preliminary report) to cause analytics device 230 not to provide the categorized ticket information. Based on receiving the user interaction, analytics device 230 may not upload the categorized ticket information to server device 220. In this way, analytics device 230 may permit a user to cancel an upload of categorized ticket information.

In some implementations, analytics device 230 may iteratively and/or continuously provide categorized ticket information to server device 220. For example, assume that analytics device 230 continuously receives ticket information from a device (e.g., user device 210). Assume further that analytics device 230 continuously determines categorized ticket information, based on the ticket information and mapping information. Analytics device 230 may continuously provide the categorized ticket information to server device 220 (e.g., without user interaction). In this way, analytics device 230 may be configured to continuously categorize and provide ticket information to server device 220, which may improve an efficiency of server device 220 and/or analytics device 230.

In some implementations, analytics device 230 may provide categorized ticket information from multiple, different projects to server device 220. For example, assume that analytics device 230 receives ticket information from a first project and from a second project. Analytics device 230 may categorize the ticket information from the first project and the second project to create first categorized ticket information and second categorized ticket information. In some implementations, analytics device 230 may provide the first categorized ticket information in association with the second categorized ticket information (e.g., as part of a single file, a single upload, or the like). In this way, analytics device 230 may more efficiently provide categorized ticket information to server device 230.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example implementation 500 relating to example process 400 shown in FIG. 4. FIGS. 5A-5E show an example of categorizing ticket information and processing outliers. For the purpose of FIGS. 5A-5E, assume that a user interacts with a user interface of user device 210 that is provided by analytics device 230. Assume further that analytics device 230 is receiving ticket information for a particular client (shown as "Acme"), related to a particular project (shown as "project01").

Figure 5A:
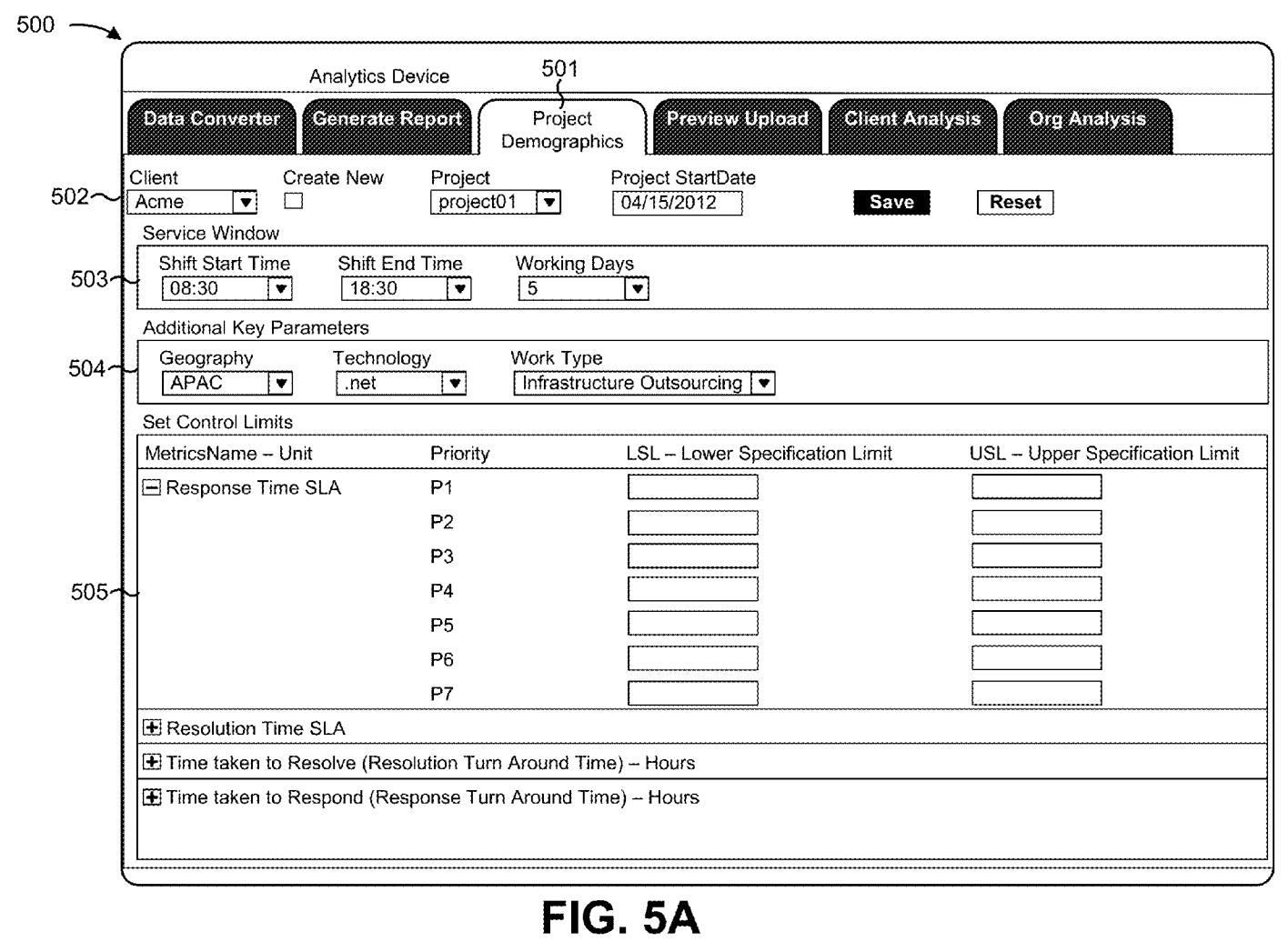

As shown in FIG. 5A, and by reference number 501, analytics device 230 may provide a project demographics user interface, via which a user may provide information related to project demographics of the ticket information. As shown by reference number 502, the user may provide a client name (e.g., Acme), a project identifier (e.g., project01), and a project start date (e.g., Apr. 15, 2012). Here, the user has not selected a "create new" checkbox. If the user had selected the "create new" checkbox, analytics device 230 may create a new client profile and/or project profile with which to associate ticket information. In some implementations, analytics device 230 may receive ticket information related to multiple, different projects. In that case, analytics device 230 may require user device 210 to provide a project identifier. Additionally, or alternatively, analytics device 230 may receive ticket information related to a single project. In that case, analytics device 230 may not require user device 210 to provide a project identifier.

As shown by reference number 503, analytics device 230 may receive information describing a working shift (e.g., analytics device 230 has received a shift start time of 08:30, a shift end time of 18:30, and a number of five working days per week of the working shift). The information describing the working shift may be used to determine and/or provide effort data (e.g., in FTE units).

As shown by reference number 504, analytics device 230 may receive information related to additional key parameters. Here, analytics device 230 receives a geography identifier, identifying the Asia-Pacific geographical region or origin that is associated with the ticket information of "APAC;" a technology identifier, identifying a technology related to the ticket information of ".net;" and a work type identifier, identifying a work type related to the ticket information of "infrastructure outsourcing."

As shown by reference number 505, analytics device 230 may receive information related to a service level agreement (SLA). For example, a user may provide information identifying a response time SLA, a resolution time SLA, a time taken to resolve SLA (e.g., a length of time to resolve a particular priority level of ticket), a time taken to respond SLA (e.g., a length of time to respond to a particular priority level of ticket), or the like. As shown, assume a user interaction with an element of the user interface (e.g., a "+" button) causes analytics device 230 to provide one or more input fields for the information related to the SLA. As further shown, the information related to the SLA may include a variety of priority levels of service tickets. In some implementations, the information related to the SLA may be optional (e.g., analytics device 230 may not require the user to input information related to the SLA).

As shown in FIG. 5B, analytics device 230 may provide a data converter user interface, via which a user may provide information related to categorizing ticket information. As shown by reference number 506, analytics device 230 may receive information identifying a data source (e.g., user device 210, or another device) and a source file (e.g., a file name of a batch of ticket information). As further shown, analytics device 230 may receive information identifying a ticket category associated with the ticket information (e.g., an incident category, a problem category, a work request category, or the like). As shown, assume that analytics device 230 automatically (e.g., without user input) populates one or more input fields based on a prior user interaction (e.g., the "client" input field is populated by "Acme" based on the user previously providing "Acme" in the "client" input field of the project demographics user interface described in association with FIG. 5A).

As shown by reference number 507, analytics device 230 may receive effort data (e.g., via one or more input fields provided in association with an "effort data capture" portion of the user interface). As further shown, analytics device 230 may receive effort data in association with a variety of priority levels of service tickets. In some implementations, the effort data may be included with the batch of ticket information (e.g., as ticket data, or the like). In that case, analytics device 230 may not provide the one or more input fields in association with the "effort data capture" portion of the user interface. Additionally, or alternatively, analytics device 230 may provide the one or more input fields, and may use effort data received via the one or more input fields instead of the effort data included with the batch of ticket information (e.g., the effort data input via the one or more input fields may override the effort data included with the batch of ticket information).

Figure 5C:
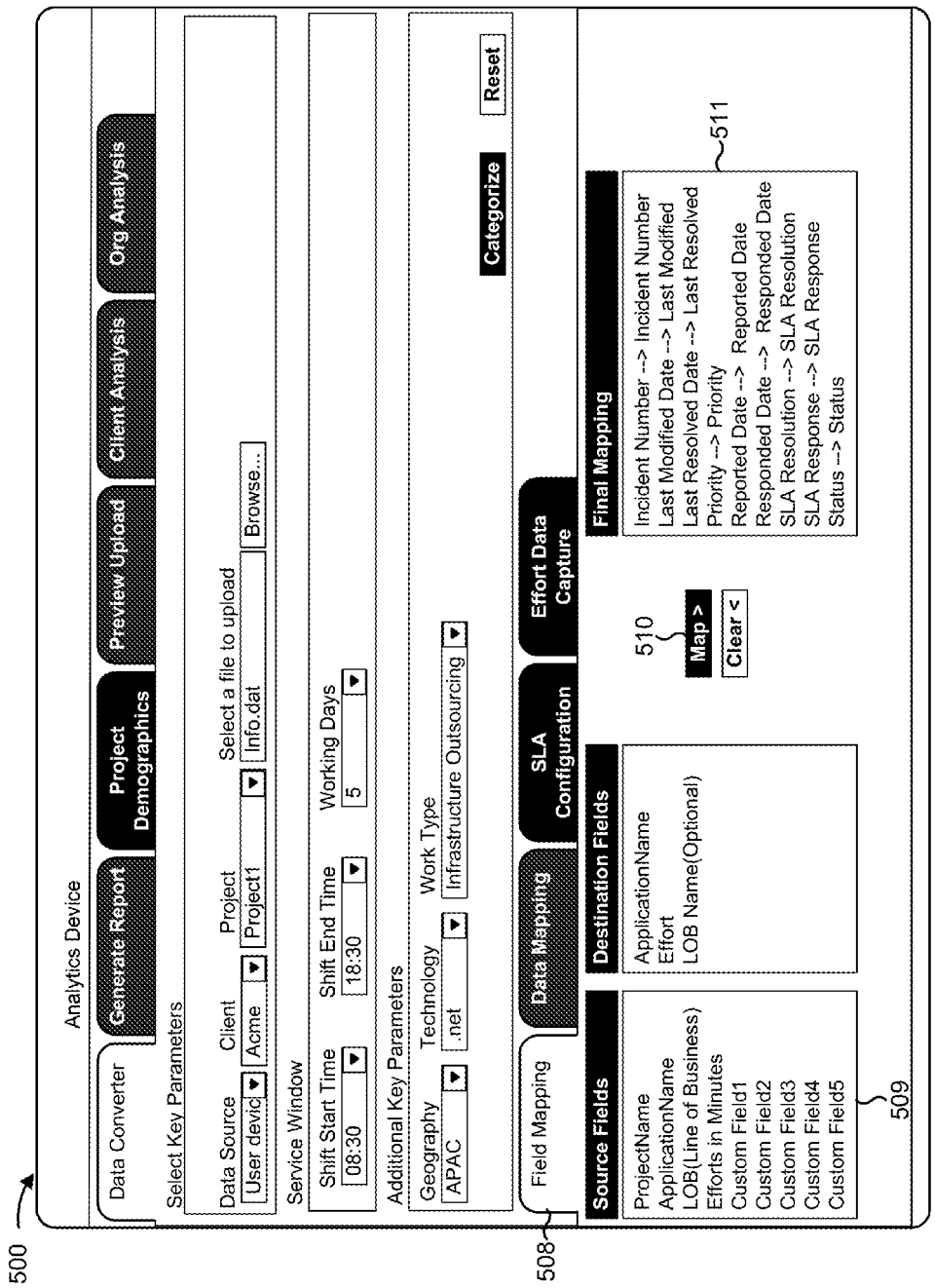

As shown in FIG. 5C, and by reference number 508, analytics device 230 may receive mapping information related to a ticket information category (e.g., via a "field mapping" portion of the user interface). As shown by reference number 509, analytics device 230 may provide a list of one or more ticket information categories (e.g., shown as "Source Fields," and including ProjectName, ApplicationName, LOB, and so on). In some implementations, the one or more ticket information categories may include a user-defined category. As further shown, analytics device 230 may provide for display a list of one or more analysis categories (e.g., shown as "Destination Fields," and including ApplicationName, Effort, and LOB Name (optional)).

As shown by reference number 510, assume that analytics device 230 receives mapping information that associates a particular ticket information category and a particular analysis category (e.g., based on a user interaction, such as clicking the particular ticket information category in the "Source Fields" list and clicking the particular analysis category in the "Destination Fields" list). As further shown, assume that analytics device 230 receives a request to categorize the ticket information (e.g., based on a user interaction with a "Map>" button). As shown by reference number 511, analytics device 230 may provide information that identifies categorized ticket information (e.g., via a "Final Mapping" portion of the user interface). As shown, the user interface may include a "Clear" button (e.g., to delete mapping information that incorrectly associates a ticket information category and an analysis category).

Figure 5D:
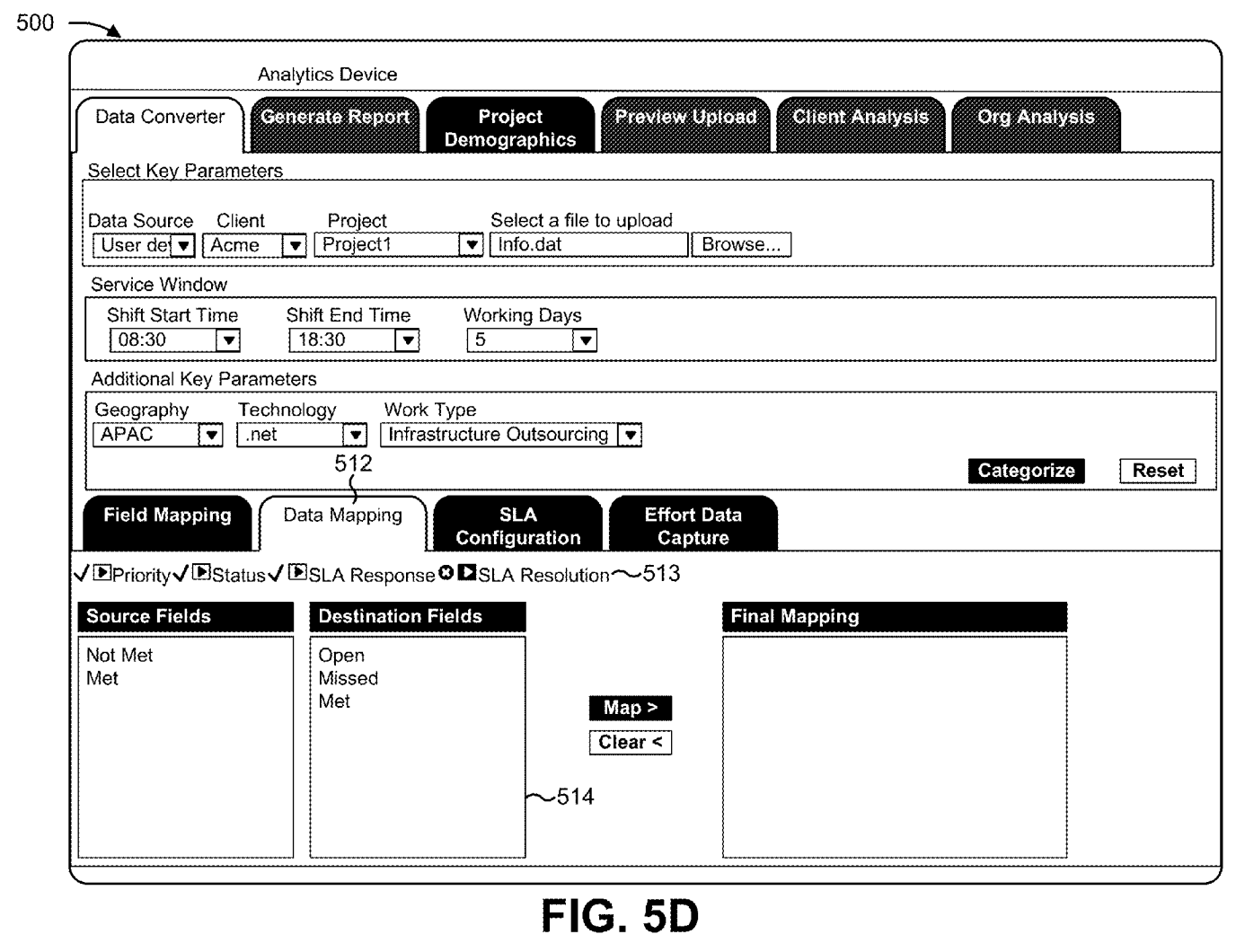

For the purpose of FIG. 5D, assume that analytics device 230 receives ticket information that identifies a priority level of each service ticket, a status indicator of each service ticket (e.g., that indicates an open status or a resolved status of each service ticket), and SLA response ticket data (e.g., that indicates whether each service ticket achieved an agreed-upon response time). As shown in FIG. 5D, and by reference number 512, assume that analytics device 230 receives mapping information related to ticket data (e.g., via a portion of the user interface associated with a "Data Mapping" tab).

As shown by reference number 513, assume that analytics device 230 receives an indication that the ticket data is SLA resolution ticket data (e.g., based on a user interaction with a triangular button provided for display in association with the name of "SLA Resolution," or the like). As further shown, assume that analytics device 230 indicates that the SLA resolution ticket data is required (e.g., by providing for display an "x" in association with the name of "SLA Resolution"). As shown, assume that analytics device 230 indicates that analytics device 230 received ticket information that identifies a priority level of each service ticket, a status indicator of each service ticket, and SLA response ticket data (e.g., by providing for display a check mark in association with the names of "Priority," "Status," and "SLA Response").

As shown by reference number 514, assume that analytics device 230 receives mapping information that associates the ticket information category with an analysis category (e.g., based on a user interaction with the "Source Fields" portion of the user interface and a user interaction with the "Destination Fields" portion of the user interface). Based on the mapping information, analytics device 230 may categorize the ticket data to create categorized ticket information (e.g., based on a user interaction with the "Map>" button).

As shown in FIG. 5E, and by reference number 515, analytics device 230 may receive ticket information related to one or more priority levels (e.g., based on a user interaction with a "priority" check box, or the like). As further shown, analytics device 230 may receive mapping information related to the one or more priority levels (e.g., based on a user interaction with the "Source Fields" portion of the user interface and a user interaction with the "Destination Fields" portion of the user interface). As shown by reference number 516, analytics device 230 may categorize the ticket information related to the one or more priority levels to create categorized ticket information.

As shown by reference number 517, analytics device 230 may provide a preliminary report that describes the categorized ticket information. As further shown, analytics device 230 may provide a number of service tickets received. As shown by reference number 518, analytics device 230 may provide a list of one or more outliers (e.g., if analytics device 230 determined one or more outliers, analytics device 230 may provide a list of the one or more outliers). As further shown, analytics device 230 may export the categorized ticket information and/or the one or more outliers (e.g., to a spreadsheet or the like, and based on a user interaction with an "export" button).

As indicated above, FIGS. 5A-5E are provided merely as an example. Other examples are possible and may differ from what was described with regard to FIGS. 5A-5E.

Figure 6C:
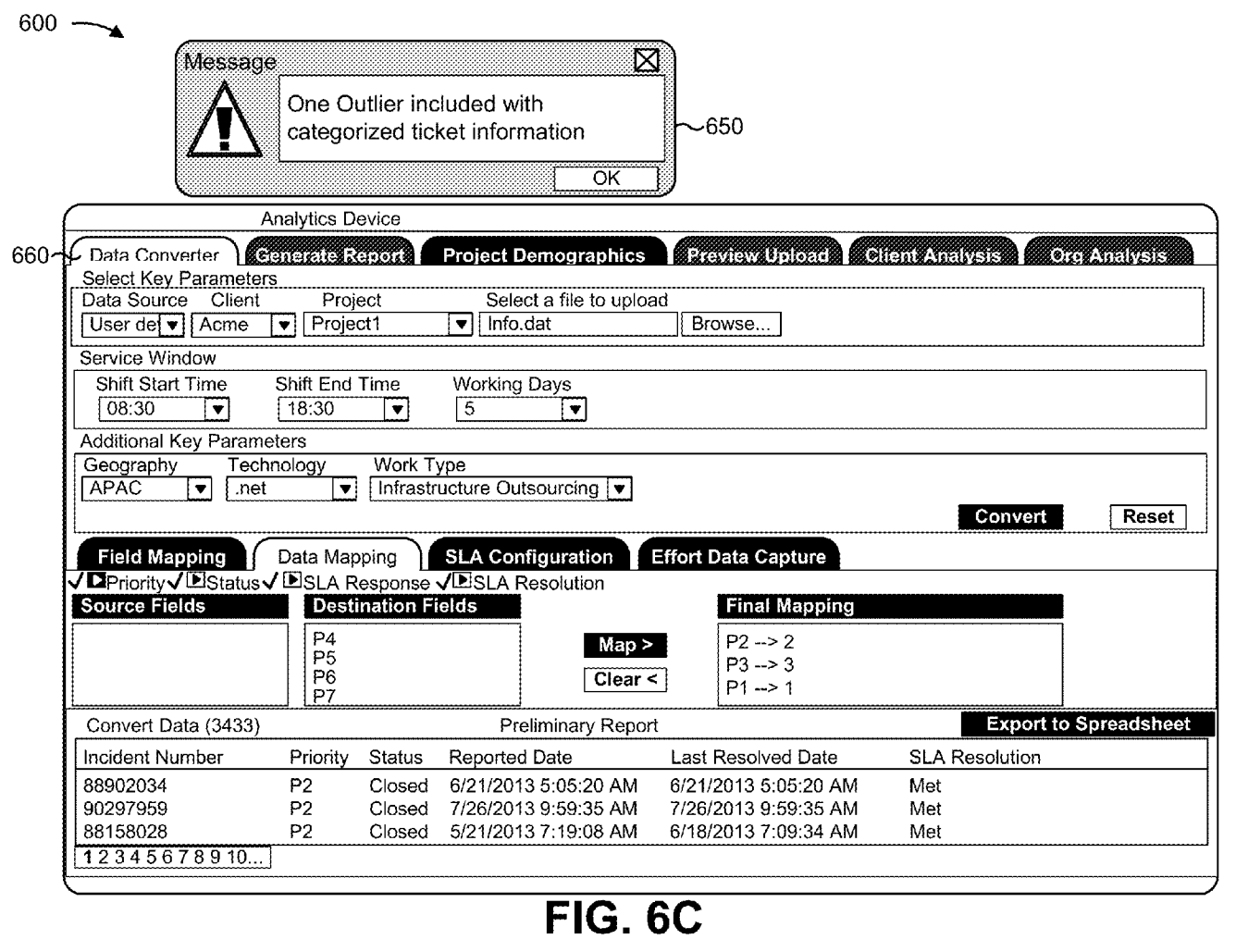

FIGS. 6A-6C are diagrams of an example implementation 600 relating to example process 400 shown in FIG. 4. FIGS. 6A-6C show an example of categorizing ticket information and processing outliers. For the purpose of FIGS. 6A-6C, assume that analytics device 230 has received a batch of ticket information including 4,299 service tickets that are associated with a priority level of P2. Assume further that analytics device 230 has determined that 866 of the service tickets are outliers based on a resolution time of each of the outliers being greater than a resolution time of other service tickets of the batch of ticket information. Assume that analytics device 230 provides a preliminary report before uploading the batch of ticket information to server device 220.

As shown in FIG. 6A, analytics device 230 may provide, with the preliminary report, information identifying outliers. Here, analytics device 230 has provided, for each outlier, an incident number, a priority level identifier, a status identifier, a reported date, a time of resolution, an SLA resolution indicator, and a reason each outlier was determined. Assume that the particular outliers described with regard to FIGS. 6B and 6C, below, are associated with the same batch of ticket information as the outliers described in FIG. 6A, but may be different particular outliers.

As shown in FIG. 6B, analytics device 230 may provide, in association with the preliminary report, a user interface, via which a user can cause user device 210 to provide an outlier action indicator. As shown by reference number 610, analytics device 230 may provide, via user device 210 and with the preliminary report, a list of non-outlier service tickets and information associated with the non-outlier service tickets. As shown by reference number 620, analytics device 230 may further provide a list of outliers, and may indicate a default action (e.g., analytics device 230 may exclude outliers by default, and may require user device 210 to indicate any outlier that analytics device 230 is to include with the categorized ticket information). As further shown, user device 210 may indicate an outlier to include with the categorized ticket information (e.g., user device 210 has indicated the outlier associated with incident number 88158028 by selecting the checkbox provided for display next to the incident number). As shown by reference number 630, user device 210 may provide an outlier action indicator that indicates that analytics device 230 is to include only the selected outlier with the categorized ticket information (e.g., based on a user interaction with the "Merge Selected" button of the user interface). In some implementations, user device 210 may provide an outlier action indicator that indicates that analytics device 230 is to include all outliers with the categorized ticket information (e.g., based on a user interacting with the "Merge ALL Outliers" button of the user interface). As shown by reference number 640, user device 210 may cause analytics device 230 to prepare a preview of the categorized ticket information that includes the outlier associated with incident number 88158028.

As shown in FIG. 6C, analytics device 230 may provide the preview of the categorized ticket information that includes the outlier. As shown by reference number 650, analytics device 230 may provide an indication of a number of outliers included with the categorized ticket information based on the outlier action indicator (e.g., one outlier was included, so analytics device 230 indicates that the one outlier was included).

As shown by reference number 660, analytics device 230 may provide, via a data converter portion of the user interface, the categorized ticket information including the outlier. Based on a user interaction, analytics device 230 may provide the categorized ticket information to another device, such as server device 220, as described in more detail elsewhere herein.

As indicated above, FIGS. 6A-6C are provided merely as an example. Other examples are possible and may differ from what was described with regard to FIGS. 6A-6C.

Figure 7:
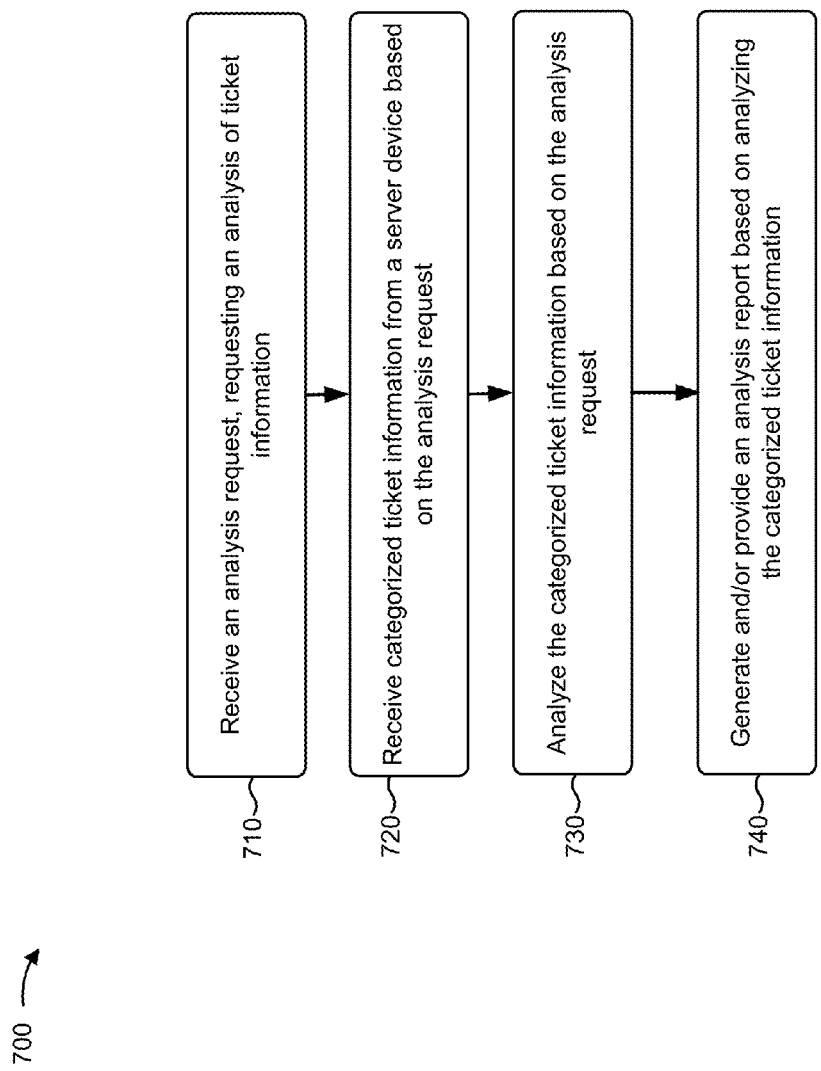
FIG. 7 is a flow chart of an example process for analyzing ticket information and generating an analysis report.

FIG. 7 is a flow chart of an example process 700 for analyzing ticket information and generating an analysis report. In some implementations, one or more process blocks of FIG. 7 may be performed by analytics device 230. In some implementations, one or more process blocks of FIG. 7 may be performed by another device or a set of devices separate from or including analytics device 230, such as user device 210 and/or server device 220.

As shown in FIG. 7, process 700 may include receiving an analysis request, requesting an analysis of ticket information (block 710). For example, analytics device 230 may receive an analysis request from user device 210. The analysis request may request that analytics device 230 or another device perform an analysis of categorized ticket information. In some implementations, the categorized ticket information may be stored locally by analytics device 230. Additionally, or alternatively, the categorized ticket information may be stored by another device, such as server device 220.

In some implementations, analytics device 230 may receive the analysis request based on a user interaction. For example, analytics device 230 may provide, via user device 210, a user interface. A user may interact with the user interface (e.g., with a button provided in association with the preliminary report) to cause analytics device 230 to receive an analysis request. In this way, analytics device 230 may facilitate a user interaction to cause analytics device 230 to analyze categorized ticket information.

Additionally, or alternatively, analytics device 230 may receive a user interaction with an analysis report. For example, assume that analytics device 230 has previously provided an analysis report that describes categorized ticket information. Assume further that the analysis report facilitates a user interaction to cause analytics device 230 to further analyze the categorized ticket information (e.g., assume that a user may click on a particular data point in a chart to cause analytics device 230 to further analyze the particular data point). Based on the user interaction with the analysis report, analytics device 230 may receive an analysis request. In this way, analytics device 230 may receive an analysis request based on a user interaction with a previously provided analysis report.

In some implementations, analytics device 230 may receive an analysis request that requests that analytics device 230 perform a predefined type of analysis. For example, assume that analytics device 230 is configured to determine turnaround times of a batch of service tickets based on categorized ticket information associated with the batch of service tickets. Assume further that analytics device 230 provides, via user device 210, a user interface that facilitates an analysis request to determine the turnaround times associated with a batch of service tickets. Based on a user interaction with the user interface, analytics device 230 may receive the analysis request. In this way, analytics device 230 may aid a user in requesting a commonly-performed type of analysis, by pre-defining the commonly-performed type of analysis.

In some implementations, analytics device 230 may receive an analysis request that requests a user-defined type of analysis. For example, assume that analysis device 230 receives ticket information that includes a user-defined category associated with geographical region ticket data. Assume further that a user, via user device 210, provides an analysis request to cause analytics device 230 to analyze categorized ticket information based on the user-defined category (e.g., by selecting a "geographical region" option in a user interface that facilitates analysis requests). Analytics device 230 may receive the analysis request, and may analyze the categorized ticket information based on the user-defined category (e.g., may calculate one or more turnaround times of tickets associated with a particular geographical region, or the like). In this way, analytics device 230 may facilitate analysis based on a user-defined category, which may allow a user to analyze information unique to a particular client, project, application, or the like.

In some implementations, analytics device 230 may request categorized ticket information based on the analysis request. For example, assume that analytics device 230 receives an analysis request that requests analysis of categorized ticket information that is stored by server device 220 (e.g., analytics device 230 may have previously provided the categorized ticket information to server device 220, and may not locally store the categorized ticket information). Based on the analysis request, analytics device 230 may request, from server device 220, the categorized ticket information. In this way, analytics device 230 may reduce local storage requirements by storing categorized ticket information on server device 220.

As shown in FIG. 7, process 700 may include receiving categorized ticket information from a server device based on the analysis request (block 720). For example, analytics device 230 may receive categorized ticket information from server device 220 based on the analysis request (e.g., if the analysis request requested analysis of categorized ticket information that is not locally stored by analysis device 230). In some implementations, analytics device 230 may request the categorized ticket information from server device 220 based on an analysis request.

In some implementations, analytics device 230 may receive a portion of available categorized ticket information. For example, assume that server device 220 stores categorized ticket information related to a three-year range of tickets. Assume further that analytics device 230 receives an analysis request to analyze only categorized ticket information related to a second year of the three-year range. Based on the analysis request, analytics device 230 may receive categorized ticket information relating to only the second year of the three-year range. In this way, analytics device 230 may reduce network, storage, and processor requirements by receiving a portion of available categorized ticket information.

As further shown in FIG. 7, process 700 may include analyzing the categorized ticket information based on the analysis request (block 730). For example, analytics device 230 may analyze the categorized ticket information based on the analysis request. In some implementations, another device, such as server device 220, may analyze the categorized ticket information. In that case, server device 220 may provide analysis information to analytics device 230.

In some implementations, analytics device 230 may analyze an outlier of the categorized ticket information. For example, assume that analytics device 230 receives an analysis request that requests that analytics device 230 analyze categorized ticket information that includes an outlier (e.g., the analysis request may request that analytics device 230 generate a box plot of the categorized ticket information that includes the outlier). Based on the analysis request, analytics device 230 may include the outlier when analyzing the categorized ticket information. Additionally, or alternatively, analytics device 230 may exclude the outlier when analyzing the categorized ticket information. For example, analytics device 230 may receive a user interaction (e.g., via a user interface of user device 210) to cause analytics device 230 to exclude the outlier when analyzing the categorized ticket information. Based on receiving the user interaction, analytics device 230 may exclude the outlier. In this way, analytics device 230 may selectively include or exclude an outlier, to aid the user in interpreting the categorized ticket information and understanding the analysis report.

In some implementations, analytics device 230 may analyze the categorized ticket information based on a stratification parameter. For example, assume that analytics device 230 receives an analysis request to analyze categorized ticket information based on a stratification parameter (e.g., a priority level of a batch of categorized ticket information). Analytics device 230 may analyze the batch of categorized ticket information based on the stratification parameter, and may generate an analysis report based on the stratification parameter (e.g., a chart, showing categorized ticket information related to each priority level). In this way, analytics device 230 may analyze categorized ticket information and may generate an analysis report based on a stratification parameter, to aid the user in interpreting the categorized ticket information to analyze a metric across multiple, different stratification levels.

In some implementations, analytics device 230 may analyze the categorized ticket information based on a predefined type of analysis. For example, assume that analytics device 230 is configured to determine a resolution turnaround time (e.g., an amount of time passed between receiving a particular service ticket and resolving the particular service ticket). Analytics device 230 may analyze the categorized ticket information to determine the resolution turnaround time.

Additionally, or alternatively, analytics device 230 may analyze the categorized ticket information based on a user-defined type of analysis. For example, assume that user device 210 provides a rule to configure analytics device 230 to determine an average effort level based on a geographic location associated with a batch of service tickets (e.g., user device 210 may provide the rule based on a user interaction, or the like). Based on the rule, analytics device 230 may determine the average effort level based on the geographic location associated with the batch of service tickets. In this way, analytics device 230 may be configured to perform a user-defined type of analysis, which may aid the user in interpreting categorized ticket information that includes a user-defined category and improve user analysis of the categorized ticket information.

As further shown in FIG. 7, process 700 may include generating and/or providing an analysis report based on analyzing the categorized ticket information (block 740). For example, analytics device 230 may generate an analysis report based on analyzing the categorized ticket information. In some implementations, the analysis report may include a graphical representation of categorized ticket information, a graphical representation of a stratification parameter, multiple, different graphical representations of categorized ticket information and/or a stratification parameter, textual information that describes categorized ticket information, an element that supports user interaction, or the like.

In some implementations, another device, such as server device 220, may provide analysis information used to generate the analysis report. For example, assume that analytics device 230 receives an analysis request to analyze categorized ticket information. Assume further that server device 220 stores the categorized ticket information. Rather than requesting the categorized ticket information from server device 220, analytics device 230 may request analysis information based on the categorized ticket information from server device 220. Server device 220 may analyze the categorized ticket information, and may provide the analysis information to analytics device 230. Based on the analysis information, analytics device 230 may generate the analysis report. In this way, analysis device 230 may reduce local processing and storage requirements, by receiving analysis information from server device 220 rather than analyzing the categorized ticket information locally.

In some implementations, the analysis report may facilitate a user interaction. For example, assume that an analysis report includes a bar graph that shows an average turnaround time of a batch of tickets in each year of a four year time period. In other words, the bar graph may include four bars. In some implementations, user device 210 may cause analytics device 230 to provide for display a different time period (e.g., a three year time period; a one year time period, with the bar graph displaying an average turnaround time of the batch of service tickets for each quarter, each month, each day, or the like, of the one year time period; or the like). In some implementations, user device 210 may cause analytics device 230 to display information related to the analysis report. For example, given the bar graph described above, user device 210 may cause analytics device 230 to display more information related to an average turnaround time (e.g., based on a user clicking on the average turnaround time shown), such as a number of tickets included in the average turnaround time calculation, a standard deviation of the average turnaround time, information related to an outlier included in the average turnaround time, or the like.

In some implementations, an interaction with the analysis report may cause analytics device 230 to provide for display information at a higher level of detail. For example, assume that analytics device 210 provides, for display in an analysis report, a chart that shows information related to four clients. Assume further that a user interacts with the chart by clicking a name of a particular client. Based on the user interaction, analytics device 230 may provide for display LOB information that describes one or more lines of business of the particular client. Assume that the user further interacts with the LOB information (e.g., by selecting one of the lines of business). In that case, analytics device 230 may provide for display application information related to the line of business that the user selected. In this way, analytics device 230 may aid a user in drilling down into more detailed information that is provided by an analysis report, which may aid the user in determining an improvement opportunity related to the analysis information.

In some implementations, the analysis report may support filtering. For example, assume that an analysis report includes categorized ticket information that is associated with a variety of geographical origins. Assume further that the analysis report lists the variety of geographical origins and facilitates a user interaction to filter the analysis report based on the variety of geographical origins (e.g., by listing, individually, each of the variety of geographical origins, and associating a checkbox or the like with each of the variety of geographical origins). Assume that user device 210 causes analytics device 230 to filter the analysis report based on the variety of geographical origins (e.g., based on a user interaction of selecting a subset of the variety of geographical origins). Based on the user interaction, analytics device 230 may filter the analysis report (e.g., may display only information associated with the selected subset of the variety of geographical origins, may highlight information associated with the selected subset of the variety of geographical origins, or the like). In this way, analytics device 230 may aid a user in understanding the analysis report by filtering the information included in the analysis report.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

FIGS. 8A-8D are diagrams of an example implementation 800 relating to example process 700 shown in FIG. 7. FIGS. 8A-8D show an example of analyzing ticket information and generating an analysis report.

Figure 8A:
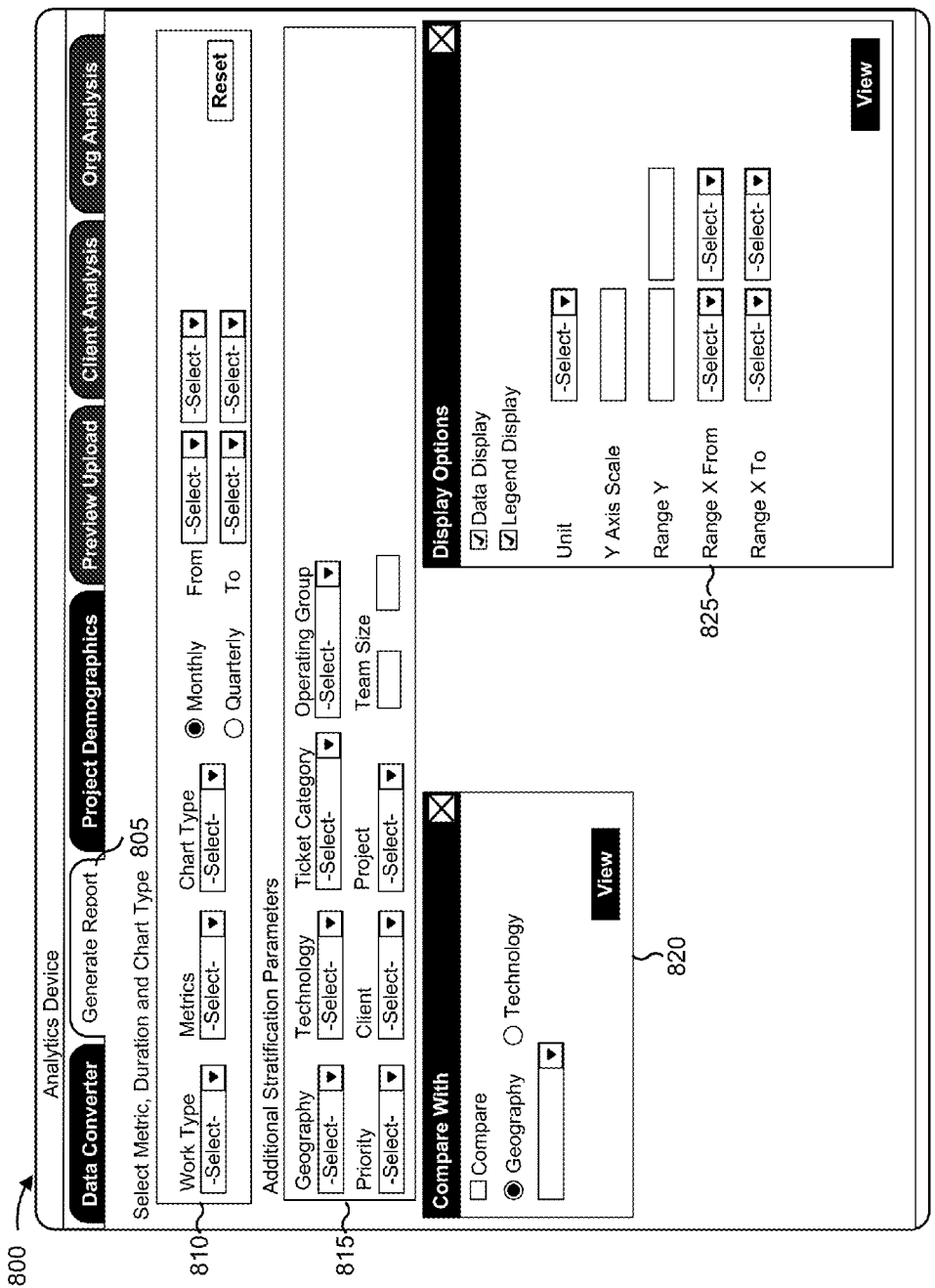

As shown in FIG. 8A, analytics device 230 may provide a user interface for generating and providing an analysis report. As shown by reference number 805, the user interface may be associated with a "generate report" tab. As shown by reference number 810, analytics device 230 may receive information that defines a metric (e.g., a response turnaround time metric, a resolution turnaround time metric, a SLA resolution metric, a ticket inflow rate metric, an effort data metric, an effort per FTE unit metric, a total effort metric, a backlog processing efficiency metric, an aging metric, or the like), a chart type (e.g., a box plot, a scatter plot, a pie graph, a histogram, or the like), and duration information (e.g., a monthly option to display information on a monthly basis, a quarterly option to display information on a quarterly basis, and one or more dates to define a range of the analysis report).

As shown by reference number 815, analytics device 230 may receive a stratification parameter (e.g., via the user interface for generating and providing the analysis report). Here, analytics device 230 may receive a stratification parameter related to a geographical location, a technology, a ticket category, an operating group, a priority level, a client identifier, a project identifier, and/or a team size range. As shown by reference number 820, analytics device 230 may receive an indicator to perform a comparison of the categorized ticket information. For example, analytics device 230 may perform a comparison of the categorized ticket information based on a geographical location and/or on a technology type. In some implementations, analytics device 230 may generate a graphical representation based on performing the comparison, and may provide the graphical representation for display. Here, assume that analytics device 230 has not received the indicator to perform the comparison of the categorized ticket information.

As shown by reference number 825, analytics device 230 may receive information related to display options. For example, analytics device 230 may receive an indicator to display ticket data in association with the analysis report, an indicator to display a legend in association with the analysis report, and/or information related to a chart to display in association with the analysis report (e.g., a base unit of the chart, a scale of a y-axis of the chart, a range of the y-axis of the chart, and/or a range of an x-axis of the chart).

Figure 8B:
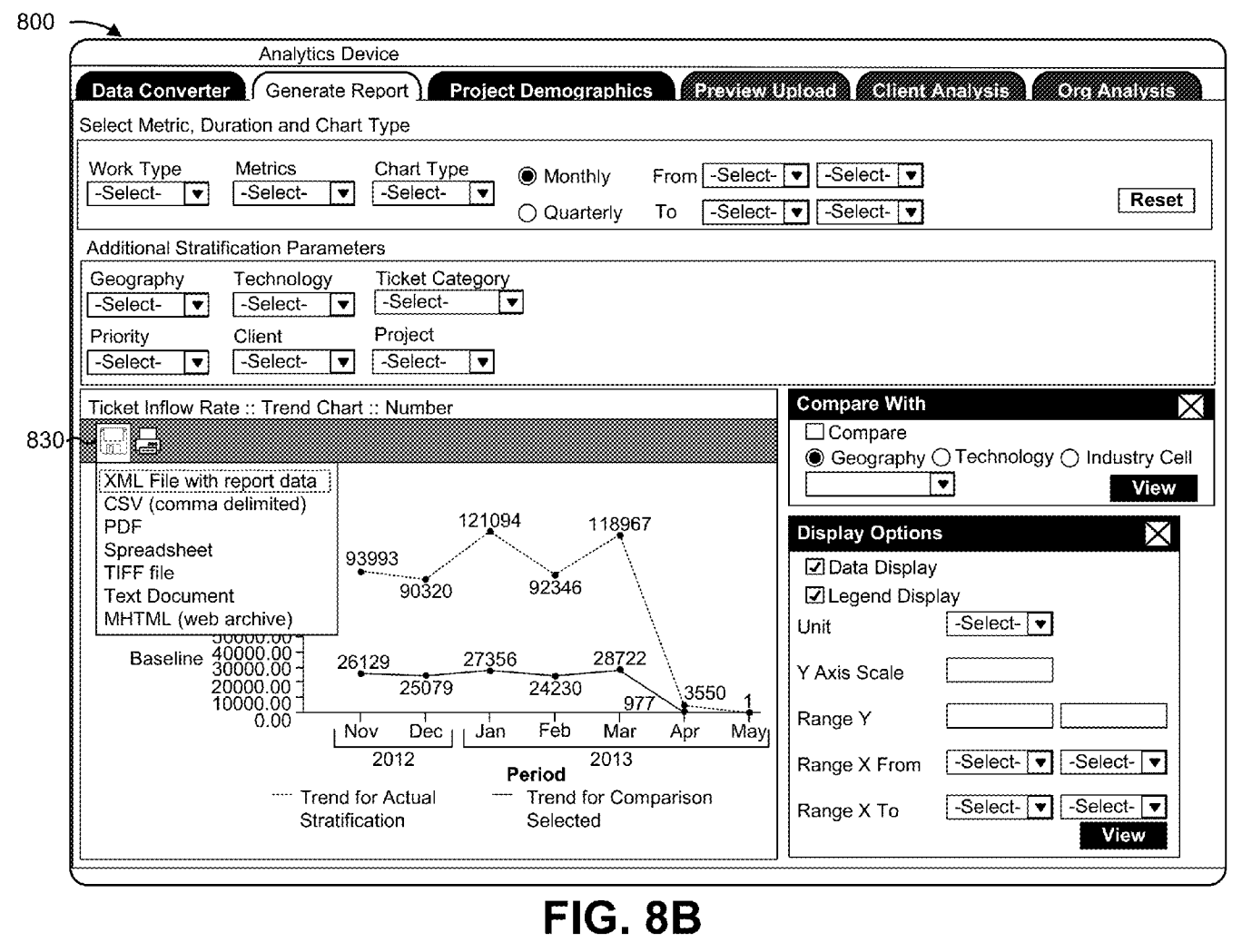

For the purpose of FIG. 8B, assume that analytics device 230 receives an indicator to generate the analysis report. As shown in FIG. 8B, assume that analytics device 230 generates the analysis report based on receiving the indicator to generate the analysis report. Assume further that analytics device 230 generates a chart based on a ticket inflow rate (e.g., a number of tickets received per month) and a stratification parameter (e.g., a particular priority level of service tickets, or the like). As shown by reference number 830, analytics device 230 may provide, for display, a chart. As shown, the chart may describe categorized ticket information based on the stratification parameter. As further shown, analytics device 230 may be capable of providing the analysis report in a variety of file formats (e.g., an extensible markup language (XML) file, a comma-separated value (CSV) file, a portable document format (PDF) file, and so on).

Figure 8C:
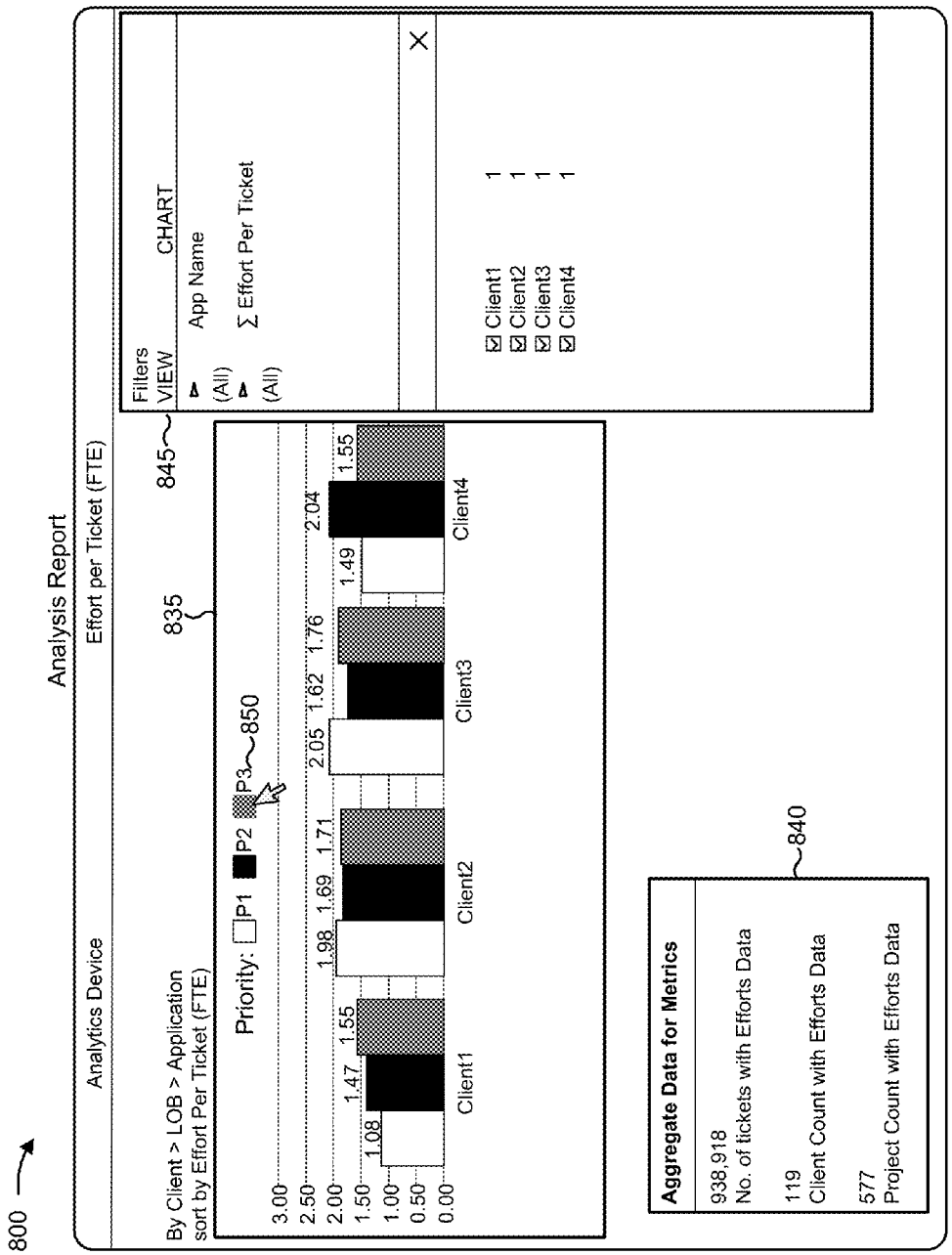
Figure 8D:
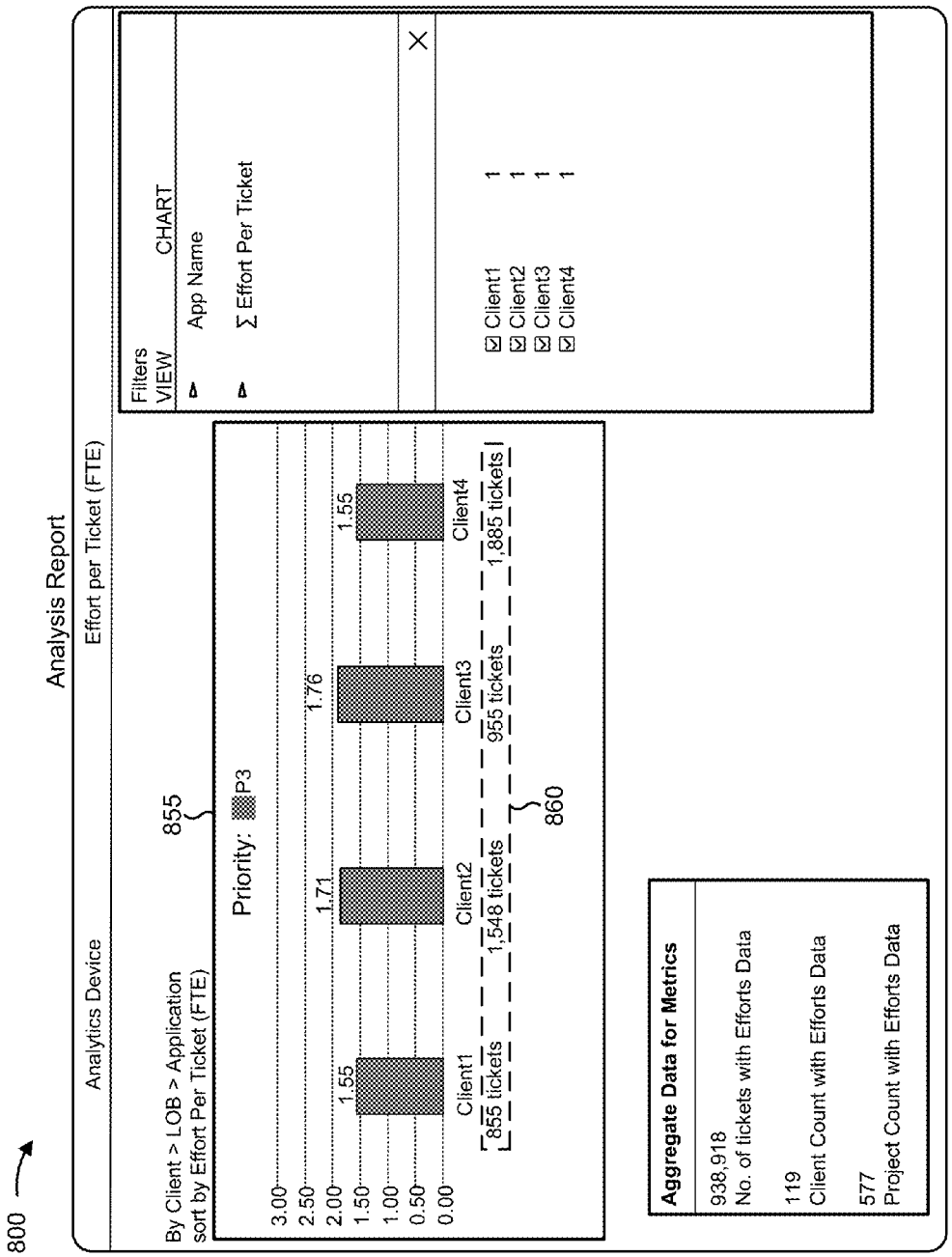

For the purpose of FIGS. 8C and 8D, assume that analytics device 230 provides an analysis report based on categorized ticket information that includes effort data (e.g., in full-time equivalent units) related to four clients (e.g., Client1, Client2, Client3, and Client4) and three priority levels (e.g., shown as P1, P2, and P3) that are associated with service tickets from the four clients. As shown in FIG. 8C, and by reference number 835, assume that analytics device 230 provides a bar graph that describes the effort data and the three priority levels. As shown by reference number 840, analytics device 230 may provide information related to the bar graph (e.g., a number of service tickets associated with effort data, a number of clients associated with effort data, and a number of projects associated with effort data).

As shown by reference number 845, analytics device 230 may provide one or more filters (e.g., an application name filter, a change in effort per service ticket filter, or the like). If analytics device 230 receives an indicator to apply the one or more filters, analytics device 230 may apply the one or more filters to the categorized ticket information, and may generate an analysis report based on applying the one or more filters. For example, if analytics device 230 receives an indicator to apply the application name filter (e.g., based on a user interaction with the user interface), analytics device 230 may generate a bar graph that describes effort data based on an application name. In this way, analytics device 230 may generate analytic information based on a variety of stratification parameters and/or ticket fields.

As shown by reference number 850, assume that analytics device 230 receives a user interaction with an element of the analysis report (e.g., with a "P3" element of the legend associated with the bar graph). Assume further that analytics device 230 generates a bar graph of information related to service tickets associated with a priority level of P3 based on the user interaction with the "P3" element of the legend.

As shown in FIG. 8D, and by reference number 855, analytics device 230 may provide for display a bar graph of information related to service tickets associated with a priority level of P3 (e.g., based on the user interaction described in FIG. 8C). As shown by reference number 860, analytics device 230 may provide additional information based on the user interaction with the "P3" element of the legend (e.g., a number of service tickets analyzed to create the analysis report).

As indicated above, FIGS. 8A-8D are provided merely as an example. Other examples are possible and may differ from what was described with regard to FIGS. 8A-8D.

As described herein, analytics device 230 may receive ticket information and may categorize the ticket information to create categorized ticket information. The categorized ticket information may be stored by analytics device 230 or another device, such as server device 220. By creating the categorized ticket information, analytics device 230 may improve an efficiency of storing and/or analyzing ticket information. Analytics device 230 may further analyze the categorized ticket information based on predetermined or user-defined analysis types. Analytics device 230 may provide an analysis report that facilitates user interaction. Based on receiving a user interaction with the analysis report, analytics device 230 may further analyze the categorized ticket information and/or may provide for display other information related to the categorized ticket information. In this way, analytics device 230 may aid a user in understanding and/or analyzing ticket information; identifying an opportunity for improving a metric related to ticket resolution; and monitoring a performance metric of multiple, different teams or shifts related to multiple, different ticket information categories.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   receive ticket information associated with one or more service tickets,
   the ticket information including a ticket category and ticket data associated with the one or more service tickets,
   the ticket data being associated with the ticket category, and
   the ticket data describing information related to resolving the one or more service tickets;
   identify, based on the ticket category or the ticket data, an association between the ticket category and an analysis category,
   the analysis category being used to analyze the ticket information;
   generate categorized ticket information based on the analysis category and the ticket information,
   the categorized ticket information including the ticket data,
   the ticket data being associated with the analysis category; and
   provide the categorized ticket information.

2. The device of claim 1, where the one or more processors are further to:
   determine an outlier of the categorized ticket information based on the ticket data;
   provide a report that includes information identifying the outlier,
   the report requesting an outlier action indicator,
   the outlier action indicator indicating an action for the device to perform related to the outlier;
   receive the outlier action indicator; and
   where the one or more processors, when providing the categorized ticket information, are further to:
   selectively remove the outlier or include the outlier with the categorized ticket information based on the outlier action indicator.

3. The device of claim 1, where the one or more processors are further to:
   receive an analysis request,
   the analysis request requesting an analysis of the categorized ticket information;
   perform the analysis of the categorized ticket information, based on receiving the analysis request, to determine analysis information;
   generate an analysis report based on the analysis information; and
   provide the analysis report.

4. The device of claim 3, where the categorized ticket information is first categorized ticket information; and
   where the one or more processors, when generating the categorized ticket information, are further to:
   receive, from a server device, second categorized ticket information,
   the second categorized ticket information being received based on the analysis request; and
   where the one or more processors, when performing the analysis of the categorized ticket information, are further to:
   perform the analysis of the first categorized ticket information and the second categorized ticket information to determine the analysis information.

5. The device of claim 1, where the ticket category is a user-defined ticket category; and
   where the one or more processors, when identifying the analysis category, are further to:
   identify a user-defined analysis category associated with the user-defined ticket category.

6. The device of claim 1, where the one or more processors are further to:
   receive a stratification parameter defining a metric for generating analysis information;

determine analysis information based on the stratification parameter and the categorized ticket information; and provide the analysis information.

7. The device of claim 1, where the one or more processors, when providing the categorized ticket information, are further to:

receive an upload indicator,
the upload indicator indicating whether to provide the categorized ticket information to a server device; and selectively provide the categorized ticket information to the server device based on the upload indicator,
the categorized ticket information being provided to the server device when the upload indicator indicates to provide the categorized ticket information, and
the categorized ticket information not being provided to the server device when the upload indicator does not indicate to provide the categorized ticket information.

8. A computer-readable medium storing instructions, the instructions comprising:

one or more instructions that, when executed by one or more processors of a device, cause the one or more processors to:

receive ticket information associated with one or more service tickets,
the ticket information including a ticket category and ticket data associated with the one or more service tickets,
the ticket category being associated with the ticket data, and
the ticket data describing information related to resolving the one or more service tickets;

identify, based on the ticket category or the ticket data, an analysis category associated with the ticket category;

generate categorized ticket information based on the analysis category and the ticket information,
the categorized ticket information including the ticket data,
the ticket data being associated with the analysis category;

analyze the categorized ticket information to determine analysis information;

generate an analysis report that describes the analysis information; and provide, for display, the analysis report.

9. The computer-readable medium of claim 8, where the one or more instructions, when executed by the one or more processors, further cause the one or more processors to:

determine, via a user interface, an interaction with an element of the analysis report;

provide, based on the interaction, a modified analysis report,
the modified analysis report including additional information related to the element.

10. The computer-readable medium of claim 8, where the one or more instructions, when executed by the one or more processors, further cause the one or more processors to:

determine an outlier of the categorized ticket information based on the ticket data;

provide an outlier report that includes information identifying the outlier,
the outlier report requesting an outlier action indicator,
the outlier action indicator indicating an action for the one or more processors to perform related to the outlier;

receive the outlier action indicator; and selectively remove the outlier or include the outlier with the categorized ticket information based on the action indicated by the outlier action indicator.

11. The computer-readable medium of claim 10, where the one or more instructions, that cause the one or more processors to provide the outlier report, further cause the one or more processors to:

provide a preliminary report based on the categorized ticket information,
the preliminary report being provided in association with the outlier report, and
the preliminary report describing the categorized ticket information.

12. The computer-readable medium of claim 8, where the one or more instructions further cause the one or more processors to:

receive a stratification parameter defining a metric for determining analysis information; and where the one or more instructions, that cause the one or more processors to determine the analysis information, further cause the one or more processors to:
determine the analysis information based on the stratification parameter and the categorized ticket information.

13. The computer-readable medium of claim 8, where the ticket category is a user-defined ticket category; and where the one or more instructions, that cause the one or more processors to identify the analysis category, further cause the one or more processors to:
identify a user-defined analysis category associated with the user-defined ticket category.

14. The computer-readable medium of claim 8, where the categorized ticket information is first categorized ticket information; and where the one or more instructions, that cause the one or more processors to generate the categorized ticket information, further cause the one or more processors to:
receive, from a server device, second categorized ticket information; and where the one or more instructions, that cause the one or more processors to analyze the categorized ticket information, further cause the one or more processors to:
analyze the first categorized ticket information and the second categorized ticket information to determine the analysis information.

15. A method, comprising:

receiving, by a device, ticket information associated with one or more service tickets,
the ticket information including a ticket category and ticket data associated with the one or more service tickets,
the ticket data being associated with the ticket category, and
the ticket data describing information related to resolving the one or more service tickets;

identifying, by the device and based on the ticket category or the ticket data, an association between the ticket category and an analysis category,
the analysis category being used to analyze the ticket information;

generating, by the device, categorized ticket information based on the analysis category and the ticket information,
the categorized ticket information including the ticket data,
the ticket data being associated with the analysis category;

determining, by the device and based on the ticket data, an outlier of the categorized ticket information;

providing, by the device, an outlier report that includes information identifying the outlier,
- the outlier report requesting an outlier action indicator,
- the outlier action indicator indicating an action for the device to perform related to the outlier;

selectively removing or including, by the device and based on the action indicated by the outlier action indicator, the outlier with the categorized ticket information; and providing, by the device, the categorized ticket information.

16. The method of claim 15, further comprising:
receiving an analysis request,
- the analysis request requesting an analysis of the categorized ticket information;

analyzing the categorized ticket information, based on the analysis request, to determine analysis information;

generating an analysis report based on the analysis information; and providing the analysis report.

17. The method of claim 16, further comprising:
receiving a stratification parameter defining a metric for generating analysis information; and where analyzing the categorized ticket information further comprises:
analyzing the categorized ticket information based on the stratification parameter and the categorized ticket information to determine the analysis information.

18. The method of claim 16, where generating the analysis report further comprises:
generating a graphical representation of the analysis information,
- the graphical representation facilitating a user interaction; and providing, with the analysis report, the graphical representation of the analysis information.

19. The method of claim 15, where providing the categorized ticket information further comprises:
receiving an upload indicator,
- the upload indicator indicating whether to provide the categorized ticket information to a server device; and selectively providing the categorized ticket information to the server device based on the upload indicator,
- the categorized ticket information being provided to the server device when the upload indicator indicates to provide the categorized ticket information, and
- the categorized ticket information not being provided to the server device when the upload indicator does not indicate to provide the categorized ticket information.

20. The method of claim 15, where the ticket category is a user-defined ticket category; and
where identifying the analysis category further comprises:
identifying a user-defined analysis category associated with the user-defined ticket category.

* * * * *